United States Patent
Raghavan et al.

(10) Patent No.: US 9,872,296 B2
(45) Date of Patent: Jan. 16, 2018

(54) TECHNIQUES FOR BEAM SHAPING AT A MILLIMETER WAVE BASE STATION AND A WIRELESS DEVICE AND FAST ANTENNA SUBARRAY SELECTION AT A WIRELESS DEVICE

(71) Applicant: QUALCOMM Incorporated, San Diego, CA (US)

(72) Inventors: Vasanthan Raghavan, North Brunswick, NJ (US); Juergen Cezanne, Ocean Township, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 14/822,681

(22) Filed: Aug. 10, 2015

(65) Prior Publication Data
US 2016/0198474 A1 Jul. 7, 2016

Related U.S. Application Data

(60) Provisional application No. 62/100,350, filed on Jan. 6, 2015, provisional application No. 62/100,352, filed on Jan. 6, 2015.

(51) Int. Cl.
*H04B 7/04* (2017.01)
*H04B 7/06* (2006.01)
(Continued)

(52) U.S. Cl.
CPC ...... *H04W 72/0466* (2013.01); *H04B 7/0456* (2013.01); *H04B 7/0617* (2013.01);
(Continued)

(58) Field of Classification Search
None
See application file for complete search history.

(56) References Cited

U.S. PATENT DOCUMENTS

| | | |
|---|---|---|
| 8,351,521 B2 | 1/2013 | Lakkis |
| 8,913,593 B2 | 12/2014 | Dinan |
| (Continued) | | |

OTHER PUBLICATIONS

Li W., et al., "Adaptive Codebook Selection for Limited Feedback MIMO Beamforming Systems," Sep. 2009, pp. 1-4.
(Continued)

*Primary Examiner* — Jamal Javaid
*Assistant Examiner* — Saad Khawar
(74) *Attorney, Agent, or Firm* — Liem T. Do

(57) ABSTRACT

Methods, systems, and devices are described for wireless communication at a user equipment (UE). A wireless communications system may improve UE discovery latency by dynamically selecting and switching beam forming codebooks at the millimeter wave base station and the wireless device. Selecting an optimal beam forming codebook may allow the wireless communication system to improve link margins between the base station without compromising resources. In some examples, a wireless device may determine whether the received signals from the millimeter wave base station satisfy established signal to noise (SNR) thresholds, and select an optimal beam codebook to establish communication. Additionally or alternately, the wireless device may further signal the selected beam codebook to the millimeter wave base station and direct the millimeter wave base station to adjust its codebook based on the selection.

56 Claims, 21 Drawing Sheets

(51) Int. Cl.
   *H04B 7/08* (2006.01)
   *H04W 72/04* (2009.01)
   *H04W 72/08* (2009.01)
   *H04B 7/0456* (2017.01)

(52) U.S. Cl.
   CPC ......... *H04B 7/0639* (2013.01); *H04B 7/0874* (2013.01); *H04W 72/085* (2013.01)

(56) References Cited

U.S. PATENT DOCUMENTS

| | | | | |
|---|---|---|---|---|
| 2008/0316913 | A1* | 12/2008 | Kim | H04B 7/061 370/210 |
| 2009/0175161 | A1 | 7/2009 | Yi et al. | |
| 2010/0091893 | A1 | 4/2010 | Gorokhov | |
| 2010/0265841 | A1* | 10/2010 | Rong | H04L 5/0023 370/252 |
| 2011/0243017 | A1 | 10/2011 | Prasad et al. | |
| 2012/0020433 | A1* | 1/2012 | Bhattad | H04B 7/0639 375/296 |
| 2013/0057432 | A1 | 3/2013 | Rajagopal et al. | |
| 2013/0223487 | A1* | 8/2013 | Zhou | H04L 25/02 375/219 |
| 2014/0071961 | A1* | 3/2014 | Nigam | H04W 72/042 370/336 |
| 2014/0169415 | A1 | 6/2014 | Werner et al. | |
| 2014/0334564 | A1 | 11/2014 | Singh et al. | |
| 2015/0223088 | A1* | 8/2015 | Niu | H04W 24/08 370/252 |
| 2016/0007340 | A1* | 1/2016 | Park | H04B 7/0626 370/329 |

OTHER PUBLICATIONS

ISA/EPO, Partial International Search Report of the International Searching Authority, Int'l App. No. PCT/US2015/064807, Feb. 23, 2016, European Patent Office, Rijswijk, NL, 6 pgs.

ISA/EPO, International Search Report and Written Opinion of the International Searching Authority, Int'l. App. No. PCT/US2015/064807, Jun. 16, 2016, European Patent Office, Rijswijk, NL, 23 pgs.

\* cited by examiner

TECHNIQUES FOR BEAM SHAPING AT A MILLIMETER WAVE BASE STATION AND A WIRELESS DEVICE AND FAST ANTENNA SUBARRAY SELECTION AT A WIRELESS DEVICE

CROSS REFERENCES

The present application for patent claims priority to U.S. Provisional Patent Application No. 62/100,350 by Raghavan et al., entitled "Techniques for Beam Shaping at a Millimeter Wave Base Station and a Wireless Device," filed Jan. 6, 2015, and U.S. Provisional Patent Application No. 62/100,352 by Raghavan et al., entitled "Techniques for Fast Selection of an Antenna Subarray and Beamforming for Millimeter Wave Wireless Connections," filed Jan. 6, 2015, both assigned to the assignee hereof, and expressly incorporated by reference herein.

BACKGROUND

Field of Disclosure

The following relates generally to wireless communications, and more specifically to techniques for beam shaping at a millimeter wave base station and for fast selection of an antenna subarray at a wireless device.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiplexing access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communications devices, which may be otherwise known as user equipment (UEs). A base station may communicate with the communications devices on downlink channels (e.g., for transmissions from a base station to a UE) and uplink channels (e.g., for transmissions from a UE to a base station).

Various communication systems may use different frequency bands depending on the particular needs of the system. For example, a millimeter wave frequency band (which may be between 30 to 300 GHz) may be used where a large concentration of UEs are relatively close to one another and/or where a relatively large amount of data is to be transferred from a base station to one or more UEs, or vice versa. Millimeter wavelength signals, however, frequently experience high path loss, and as a result, directional beam forming techniques may be used for uplink (UL) and/or downlink (DL) transmissions between a base station and a UE using millimeter wavelength frequencies. Directional beamforming techniques may enable a transmitter to transmit a signal onto a particular propagation path, and may enable a receiver to receive a signal from a particular propagation path. In this case more than one signal propagation path may exist between a UE and a base station. The reliance on directional beams, however, may make millimeter wave communications more resource-intensive.

The base station and the UE may each use multiple antennas when communicating with each other. Multiple antennas at the base station and UE may be used to take advantage of antenna diversity schemes that may improve communication rate and/or its reliability. There are different types of techniques that may be used to implement an antenna diversity scheme. For example, transmit diversity may be applied to increase the signal to noise ratio (SNR) at the receiver for a single data stream. Spatial diversity may be applied to increase the data rate by transmitting multiple independent streams using multiple antennas. Receive diversity may be used to combine signals received at multiple receive antennas to improve received signal quality and increased resistance to fading. However, in some cases, a position of the hand holding the mobile device and/or near-field effects due to the body may interfere with signals received at a plurality of antennas at the UE.

SUMMARY

Systems, methods, and apparatuses for beam shaping at a millimeter wave base station, and for fast selection of an antenna subarray at a wireless device are described. In accordance with the present disclosure, a wireless communications system may improve user equipment (UE) discovery latency by dynamically selecting and switching beamforming codebooks at the millimeter wave base station and the wireless device. Selecting an optimal beamforming codebook may allow the wireless communication system to improve link margins between the base station without compromising resources. In some examples, a wireless device may determine whether the received signals from the millimeter wave base station satisfy established signal to noise (SNR) thresholds. The wireless device may then select an optimal beam codebook to establish communications with the millimeter wave base station. Additionally or alternately, the wireless device may further signal the selected beam codebook to the millimeter wave base station and direct the millimeter wave base station to adjust its codebook based on the selection.

In accordance with the present disclosure, the user equipment (UE) may scan through a plurality of antenna subarrays one at a time with a single beamforming vector to estimate the signal to noise ratio (SNR) at the plurality of antenna subarrays. Based on the estimated SNR, the UE may determine whether the received signals are above or below an established SNR threshold level at the plurality of antenna subarrays. In some examples, the UE may select an antenna subarray from a plurality of scanned antenna subarrays that offers the desired signal quality. Additionally or alternately, the UE, after selecting an antenna subarray, may further refine the codebook of beamforming vectors at the UE and the base station in order to achieve improved link margins for the subsequent data phase between the base station and the UE.

In one example, a method of communications at a wireless device is described. The method may include receiving, at a wireless device, a first signal from a millimeter wave base station using a first beam codebook, dynamically determining that a second beam codebook, different from the first beam codebook, is to be used on the transmitted first signal, and transmitting a second signal to the millimeter wave base station requesting the millimeter wave base station to use the second beam codebook.

In one example, an apparatus for communications at a wireless device is described. The apparatus may include means for receiving, at a wireless device, a first signal from a millimeter wave base station using a first beam codebook, means for dynamically determining that a second beam codebook, different from the first beam codebook, is to be used on the transmitted first signal, and means for transmitting a second signal to the millimeter wave base station requesting the millimeter wave base station to use the second beam codebook.

In one example, a further apparatus for communications at a wireless device is described. The apparatus may include a processor, memory in electronic communication with the processor, and instructions stored in the memory, wherein the instructions are executable by the processor to receive, at a wireless device, a first signal from a millimeter wave base station using a first beam codebook, dynamically determine that a second beam codebook, different from the first beam codebook, is to be used on the transmitted first signal, and transmit a second signal to the millimeter wave base station requesting the millimeter wave base station to use the second beam codebook.

In one example, a non-transitory computer-readable medium storing code for communication at a wireless device is described. The code may include instructions executable to receive, at a wireless device, a first signal from a millimeter wave base station using a first beam codebook, dynamically determine that a second beam codebook, different from the first beam codebook, is to be used on the transmitted first signal, and transmit a second signal to the millimeter wave base station requesting the millimeter wave base station to use the second beam codebook.

Some examples of the method, apparatuses, or non-transitory computer-readable medium described above may further include processes, features, means, or instructions for determining whether a quality of the received first signal is above or below a first threshold, dynamically selecting the second beam codebook based at least in part on the determining, and transmitting the second signal to the millimeter wave base station identifying the selected second beam codebook. Additionally or alternatively, some examples may include processes, features, means, or instructions for determining whether the quality of the first signal is above or below a second threshold, and dynamically selecting the second beam codebook based at least in part on the determining. Additionally or alternatively, in some examples the second signal includes a signal energy estimate, a beamforming vector index, information for beamforming, or a combination thereof.

Some examples of the method, apparatuses, or non-transitory computer-readable medium described above may further include processes, features, means, or instructions for identifying a first receiver beam codebook used at the wireless device as being associated with the first beam codebook used by the millimeter wave base station, and requesting a switch from the first receiver beam codebook to a second receiver beam codebook associated with the second beam codebook used by the millimeter wave base station. In some examples, the request can be based at least in part on hardware and/or software complexity issues for the radio frequency chains (e.g., phase shifters, analog-to-digital converters, up/down converters and/or mixers, digital-to-analog converters, radio frequency circuitry needed to establish the links, and the like), maintenance of link issues, and/or performance improvement with metrics such as rate, reliability, or a combination thereof. Additionally or alternatively, some examples may include processes, features, means, or instructions for adapting the first threshold based at least in part on the selection of the second beam codebook.

In some examples of the method, apparatuses, or non-transitory computer-readable medium described above, the second beam codebook is selected in response to determining that the quality of signal falls below the first threshold. Additionally or alternatively, in some examples the first beam codebook is a coarse codebook and the second beam codebook is selected from a group comprising a pseudo-omni beam pattern codebook, an antenna selection codebook, a coarse codebook of broad beams, an intermediate codebook of slightly narrower beams, a fine codebook of narrowest beams, a wireless-device specific codebook based on prior information at the millimeter wave base station about the wireless device, a beam negation codebook such as a codebook of beams optimally designed to minimize interference due to simultaneous coordinated transmissions to multiple wireless devices, a codebook of beams trading off signal quality to a specific wireless device at the cost of interference to other wireless devices, or a combination of beamforming vectors from different codebooks.

In some examples of the method, apparatuses, or non-transitory computer-readable medium described above, the second signal comprises a request for the millimeter wave base station to switch to a second beam codebook, where the request may be based at least in part on hardware and/or software complexity issues for the radio frequency chains (e.g. phase shifters, analog-to-digital converters, up/down converters and/or mixers, digital-to-analog converters, radio frequency circuitry needed to establish the links, and the like.), maintenance of link issues, and/or performance improvement with metrics such as rate, reliability, or a combination thereof. Additionally or alternatively, some examples may include processes, features, means, or instructions for transmitting the second signal via a random access channel (RACH) using a coarse codebook.

Some examples of the method, apparatuses, or non-transitory computer-readable medium described above may further include processes, features, means, or instructions for transmitting the second signal over a low-frequency carrier network coexisting with a millimeter wave carrier network. Additionally or alternatively, in some examples the second signal comprises a distress signal transmitted with a unique identification at a high code rate. A high code rate signal is one where the redundancy for overcoming noise and fading uncertainties is high with the useful information at a much lower rate, which ensures reliable information recovery in poor channel conditions.

In some examples of the method, apparatuses, or non-transitory computer-readable medium described above, the first signal is a directional primary synchronization signal (DPSS). Additionally or alternatively, some examples may include processes, features, means, or instructions for calculating a signal-to-noise ratio (SNR) of the first signal to determine a quality of the first signal.

In one example, another method of communications at a wireless device is described. The method may include receiving, at a wireless device, a first signal from a millimeter wave base station, the first signal beamformed on a plurality of beamforming vectors from a first codebook, scanning at least a portion of a plurality of antenna subarrays with a plurality of beamforming vectors from a subarray selection codebook to identify the quality of the first signal received at the portion of the plurality of antenna subarrays, and selecting an antenna subarray from the scanned portion of the plurality of antenna subarrays based at least in part on the identified quality of the first signal.

In one example, another apparatus for communications at a wireless device is described. The apparatus may include means for receiving, at a wireless device, a first signal from a millimeter wave base station, means for scanning at least a portion of a plurality of antenna subarrays with a plurality of beamforming vectors from a subarray selection codebook to identify the quality of the first signal received at the portion of the plurality of antenna subarrays, and means for selecting an antenna subarray from the scanned portion of the plurality of antenna subarrays based at least in part on the identified quality of the first signal.

In one example, a further apparatus for communications at a wireless device is described. The apparatus may include a processor, memory in electronic communications with the processor, and instructions stored in the memory, wherein the instructions are executable by the processor to receive, at a wireless device, a first signal from a millimeter wave base station, scan at least a portion of a plurality of antenna subarrays with a plurality of beamforming vectors from a subarray selection codebook to identify the quality of the first signal received at the portion of the plurality of antenna subarrays, and select an antenna subarray from the scanned portion of the plurality of antenna subarrays based at least in part on the identified quality of the first signal.

In one example, another non-transitory computer-readable medium storing code for communications at a wireless device is described. The code may include instructions executable to receive, at a wireless device, a first signal from a millimeter wave base station, scan at least a portion of a plurality of antenna subarrays with a plurality of beamforming vectors from a subarray selection codebook to identify the quality of the first signal received at the portion of the plurality of antenna subarrays, and select an antenna subarray from the scanned portion of the plurality of antenna subarrays based at least in part on the identified quality of the first signal.

In some examples of the method, apparatuses, or non-transitory computer-readable medium described above, the subarray selection codebook may include a coarse codebook of broad beams covering a wide beamspace area optimally designed to minimize the wireless device discovery latency at the cost of peak beamforming gain. The subarray selection codebook may also include an intermediate codebook of slightly narrower beams covering a smaller beamspace area and corresponding to another point in the tradeoff curve between wireless device discovery latency and peak beamforming gain. The subarray selection codebook may also include a fine codebook of the narrowest beams covering the smallest beamspace area and corresponding to the highest peak beamforming gain. The subarray selection codebook may also include a codebook appropriately designed to mitigate near-field impairments at the wireless device. The subarray selection codebook may also include a codebook with a special structure appropriately designed to assist in channel estimation tasks at the wireless device. The subarray selection codebook may also include a codebook with a special structure appropriately designed to assist in radio-frequency hardware and/or software complexity reduction, reduce system complexity or cost. The subarray selection codebook may also include a pseudo-omni beam pattern codebook, or an antenna selection codebook. The subarray selection codebook may also include any combination of beamforming vectors from different codebooks thereof.

Some examples of the method, apparatuses, or non-transitory computer-readable medium described above may further include processes, features, means, or instructions for determining whether the quality of the first signal at the selected antenna subarray is above or below a first threshold, and transmitting a second signal to the millimeter wave base station based at least in part on the determining. Additionally or alternately, some examples may include processes, features, means, or instructions for scanning a plurality of beamforming vectors from a coarse codebook upon determining that the quality of the first signal at the selected antenna subarray is below the first threshold, and identifying a first beamforming vector from the plurality of beamforming vectors based at least in part on the scanning.

Some examples of the method, apparatuses, or non-transitory computer-readable medium described above may further include processes, features, means, or instructions for receiving, at the wireless device, a third signal from a millimeter wave base station, the third signal beamformed on a plurality of beamforming vectors from a second codebook, scanning a plurality of beamforming vectors from the second codebook, identifying a second beamforming vector from the plurality of beamforming vectors from the second codebook based at least in part on the scanning.

Some examples of the method, apparatuses, or non-transitory computer-readable medium described above may further include processes, features, means, or instructions for determining that the quality of the first signal at the selected antenna subarray is below a second threshold, and identifying a beamforming vector from the plurality of beamforming vectors based at least in part on the determining, wherein the beamforming vector is identified from a subarray selection codebook.

A subarray selection codebook can include a coarse codebook of broad beams covering a wide beamspace area optimally designed to minimize the wireless device discovery latency at the cost of peak beamforming gain. Additionally or alternately, the subarray selection codebook can include an intermediate codebook of slightly narrower beams covering a smaller beamspace area and corresponding to another point in the tradeoff curve between wireless device discovery latency and peak beamforming gain. Additionally or alternately, the subarray selection codebook can include a fine codebook of the narrowest beams covering the smallest beamspace area and corresponding to the highest peak beamforming gain. Additionally or alternately, the subarray selection codebook can include a codebook appropriately designed to mitigate near-field impairments at the wireless device. Additionally or alternately, the subarray selection codebook can include a codebook with a special structure appropriately designed to assist in channel estimation tasks at the wireless device. Additionally or alternately, the subarray selection codebook can include a codebook with a special structure appropriately designed to assist in radio-frequency design, reduce system complexity or cost. Additionally or alternately, the subarray selection codebook can include a pseudo-omni beam pattern codebook, and/or an antenna selection codebook. Additionally or alternately, the subarray selection codebook can include a combination of beamforming vectors from different codebooks.

Additionally or alternately, some examples may include processes, features, means, or instructions for initiating an on-demand search to identify a second beamforming vector from a plurality of beamforming vectors at the millimeter wave base station, wherein the second beamforming vector is identified from a group comprising at least one of a pseudo-omni beam pattern codebook, an antenna selection codebook, a coarse codebook, an intermediate codebook, a fine codebook, a near-field impairment mitigation codebook, a channel estimation codebook, a complexity reduction codebook, or a wireless device specific codebook.

Some examples of the method, apparatuses, or non-transitory computer-readable medium described above may further include processes, features, means, or instructions for adapting the first threshold based at least in part on a selection of a beamforming vector by the wireless device. Additionally or alternately, some examples may include processes, features, means, or instructions for transmitting the second signal via a random access channel (RACH).

Some examples of the method, apparatuses, or non-transitory computer-readable medium described above may further include processes, features, means, or instructions for transmitting the second signal over a low-frequency carrier network coexisting with a millimeter wave carries network. Additionally or alternately, in some examples the second signal may be transmitted via a highly-coded low-rate channel/network already established with a unique identification. Additionally or alternately, in some examples the second signal comprises a signal energy estimate, a beamforming vector index, information for beamforming, or a combination thereof.

Some examples of the method, apparatuses, or non-transitory computer-readable medium described above may further include processes, features, means, or instructions for calculating a signal-to-noise ratio of the first signal to determine the quality of the first signal. Additionally or alternately, in some examples the first signal is a directional primary synchronization signal (DPSS).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, or apparatuses for beam shaping at a millimeter wave base station and a wireless device. As discussed above, millimeter wavelength signals frequently experience high path loss, and as a result, directional beam forming techniques may be used for uplink (UL) or downlink (DL) transmissions between a base station and a UE using millimeter wavelength frequencies. Directional beamforming techniques may enable a transmitter to transmit a signal onto a particular propagation path, and may enable a receiver to receive a signal from a particular propagation path.

The quality of link margins between the base station and the UE, however, may be dependent on a number of factors, including the location of the UE in relation to the millimeter wave base station or the type of codebook utilized by the base station and the UE for beamforming. For example, while broader beam codebooks (e.g., coarse codebook or intermediate codebook) may occupy greater physical angular space by compromising peak gains, the quality of signal experienced at the UE via broader beams may be marginal compared to finer beams that may offer greater power gains. On the other hand, finer beam shapes, however, may suffer from significant latency between the millimeter wave base station and the UE because of the need to run through a large set of beams to ensure coverage over the same physical angular coverage region. Therefore, optimally selecting a beam codebook from a plurality of beam codebooks may reduce UE discovery latency and improve link margins.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
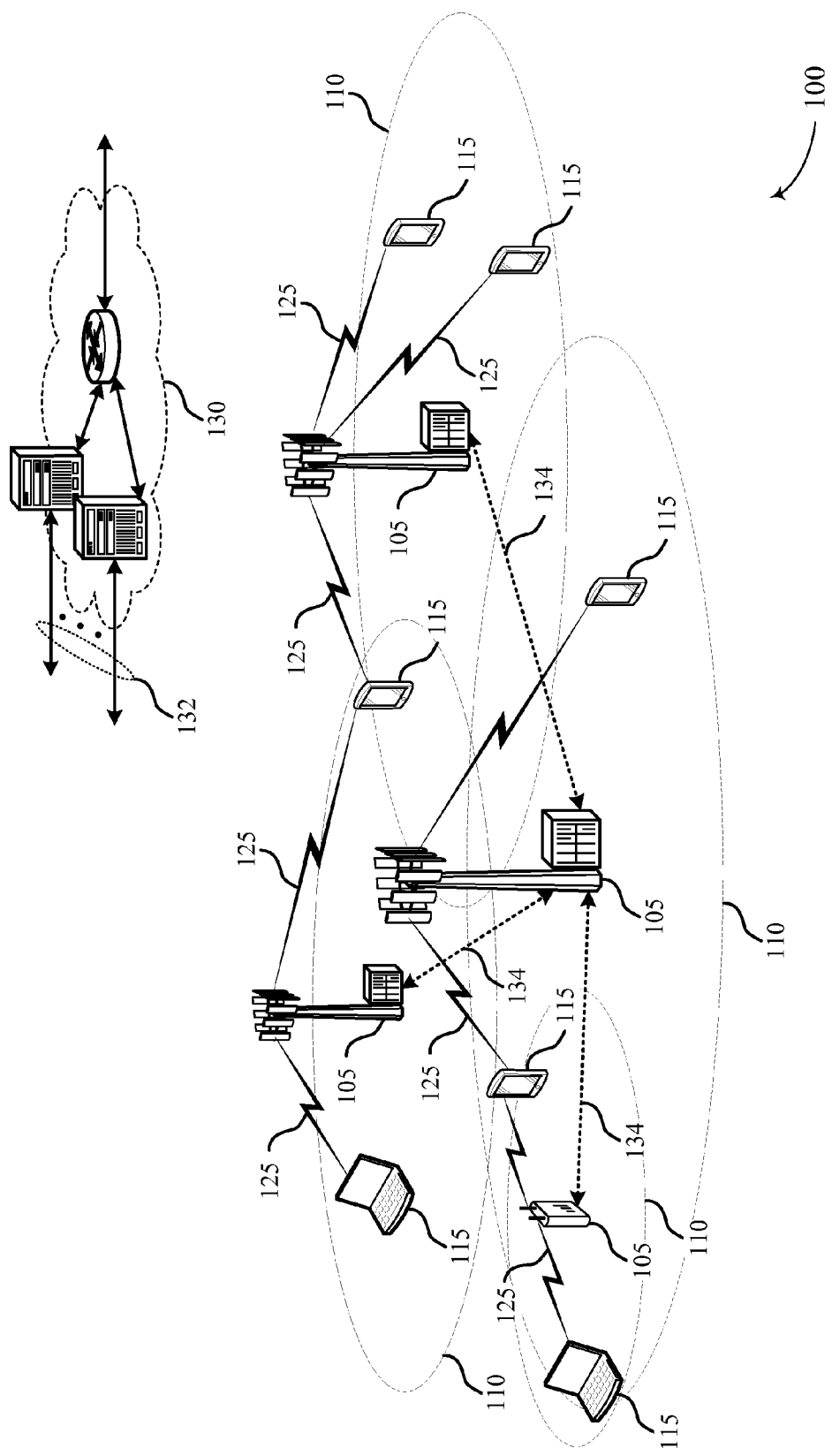
FIG. 1 illustrates an example of a wireless communications system in accordance with various aspects of the present disclosure.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 or UEs 115 may include multiple antennas for employing antenna diversity schemes to improve communication quality and reliability between base stations 105 and UEs 115. Additionally or alternately, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, SRS, and cell barring.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an UL resource grant, a timing advance and a temporary cell radio network temporary identity (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), it may repeat the RACH process by transmitting a new RACH preamble.

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to ten millimeters. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. In some examples, base stations 105 may be millimeter wave base stations configured to communicate with the UEs 115 utilizing directional beamforming. Additionally or alternately the base stations 105 may be configured for hybrid communication utilizing both low-frequency carrier network (e.g., LTE) and a high frequency carrier network (e.g., millimeter wave).

In accordance with the present disclosure, a UE 115 may dynamically select an optimal beam codebook in order to improve link margins with the base stations 105. In some examples, a UE 115, during an initial UE discovery phase in millimeter access, may receive signals by physical angle-based beam sweep initialized by the base station 105. The signal may be transmitted by the base station 105 utilizing a default beam codebook (e.g., coarse codebook) that utilizes broader beams with each beam covering a greater space (equivalently, a large 3-dB bandwidth) in the physical angle space. The default beam codebook, however, may not offer optimal power gains for beamforming, and thus negatively impact the signal quality for UEs 115 that may not be in direct line of sight (LOS) of the base station. Therefore, the UE 115, upon receiving a signal from the millimeter wave base station 105, may estimate the SNR of the received signal and determine whether the received signal satisfies signal quality thresholds established by the UE 115. In some cases, the SNR thresholds may be predetermined or dynamically adjustable by the UE 115.

In some examples, the UE 115, upon determining that the received signal is above a SNR threshold, may transmit a RACH signal with the beam so determining to convey the SNR information to the base station 105 and requesting establishment of data communications. In some cases, the UE 115 and the base station 105 may refine the beam to adjust for minor variations in signal quality. Alternately if the UE 115 determines that the received signal is below a SNR threshold, the UE 115 may select an alternate beam codebook (e.g., intermediate codebook or fine codebook with a smaller 3-dB beamwidth for each beam) for directional beamforming that may offer higher power gains. The selection of the alternate beam codebook (i.e., intermediate codebook or fine codebook) may be signaled to the base station 105 over the UL channel. In some examples, the uplink transmission may direct the base station 105 to adjust the beam codebooks at the base station 105 for subsequent transmissions.

Furthermore, millimeter wave signals may frequently experience high path loss, and as a result, directional beam forming techniques may be used for uplink (UL) and/or downlink (DL) transmissions between a base station and a UE using millimeter wave frequencies. Directional beamforming techniques may enable a transmitter to transmit a signal onto a particular propagation path, and may enable a receiver to receive a signal from a particular propagation path. In this case more than one signal propagation path may exist between a UE and a base station. However, in some cases, the position of a user's hands (and parts of the user's body) may interfere with signals received via directional beamforming. As a result, it may be ideal to scan through a plurality of antenna subarrays at the UE 115-a in order to select the optimal antenna subarray, and further refine the beamforming vectors based on the selected antenna subarray.

Figure 2:
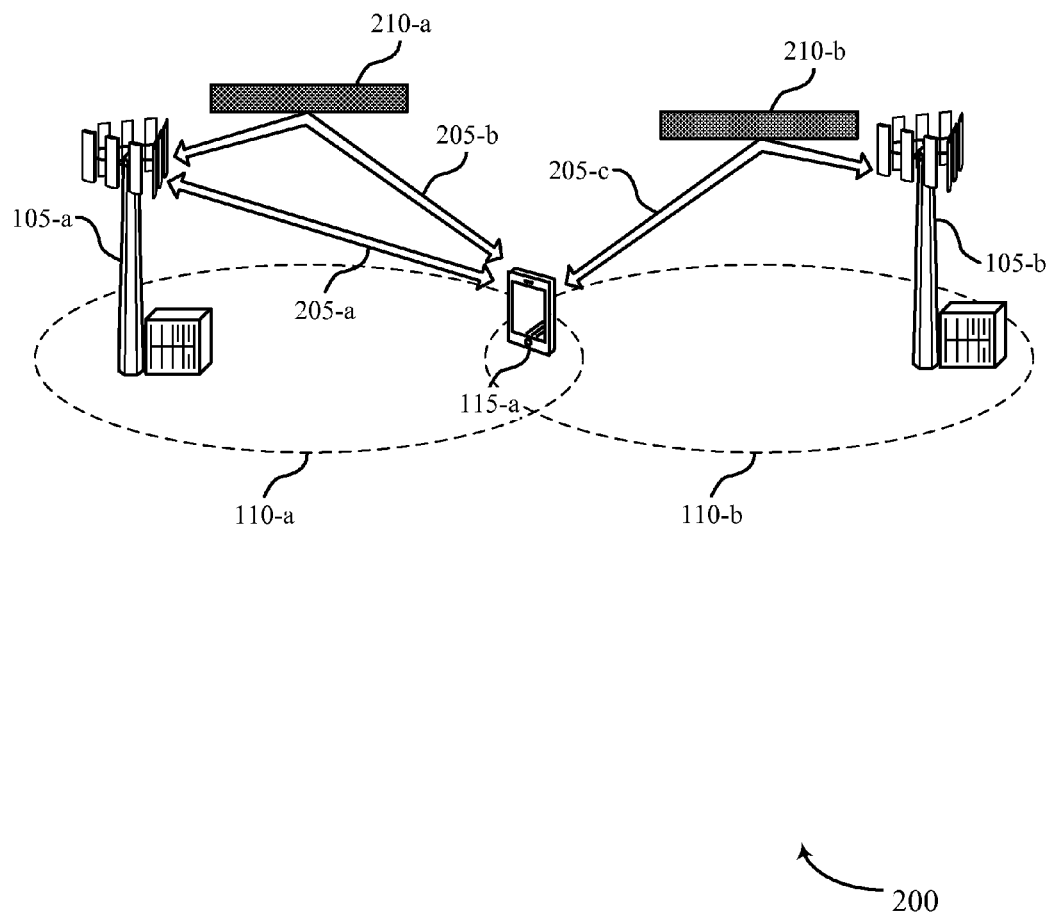
FIG. 2 illustrates an example of a wireless communications subsystem in accordance with various aspects of the present disclosure.

FIG. 2 illustrates an example of a wireless communications subsystem 200 in accordance with various aspects of the present disclosure. Wireless communications subsystem 200 may include UE 115-a, which may be an example of a UE 115 described above with reference to FIG. 1. Wireless communications subsystem 200 may also include base station 105-a and base station 105-b, which may be examples of base stations 105 described above with reference to FIG. 1. Base station 105-a and/or base station 105-b may provide wireless communications service within coverage areas 110-a and 110-b, respectively. Wireless communications subsystem 200 illustrates an example where UE 115-a is located in the intersection of coverage areas 110-a and 110-b. However, in some cases UE 115-a may be within the coverage area of a single base station 105, or more than two base stations 105.

UE 115-a, base station 105-a, and base station 105-b may each be capable of communicating using directional beamforming (e.g., using frequencies in the millimeter band). Thus, in some cases UE 115-a may communicate with base station 105-a using transmissions that follow more than one path. For example, UE 115-a may communicate with base station 105-a via a direct line-of-sight propagation path 205-a. UE 115-a and base station 105-a may also communicate via an indirect propagation path 205-b, which may be reflected off a reflective surface 210-a (e.g., windows of a building). In some examples, a UE 115-a may initially establish a DL connection and an UL connection via propagation path 205-a, and then base station 105-a may direct UE 115-a to use propagation path 205-b for transmitting UL signals to base station 105-a (e.g., by providing directional beamforming configuration information associated with propagation path 205-b). In another example, base station 105-a may direct UE 115-a to establish an UL connection with (or handover to) base station 105-b using propagation path 205-c. In some cases, a direct line-of-sight propagation path may not be available and the UE 115-a and base station 105-a may select from one or more indirect propagation paths. In one example, the propagation path 205-c may be reflected off a second reflective surface 210-b.

The propagation time for each path may be directly proportional to the distance along the path. For example, the propagation time may be approximately the length of the path divided by the speed of light. Thus, for example, a direct path such as propagation path 205-a may have a shorter propagation time than an indirect path to the same base station 105 such as propagation path 205-b. In some examples of the present disclosure, the UE 115-a may dynamically select an optimal beam codebook from a plurality of beam codebooks utilized at the UE 115-a and the base station 105-a that offers best link margins for establishing communication. In some examples, the plurality of beam codebooks may include any of a pseudo-omni beam pattern codebook, an antenna selection codebook, a coarse codebook of broad beams, an intermediate codebook of slightly narrower beams, a fine codebook of narrowest beams, a wireless-device specific codebook based on prior information at the millimeter wave base station about the wireless device, a beam negation codebook such as a codebook of beams optimally designed to minimize interference due to simultaneous coordinated transmissions to multiple wireless devices, a codebook of beams trading off signal quality to a specific wireless device at the cost of interference to other wireless devices, or, a combination of beamforming vectors from different codebooks.

Figure 3:
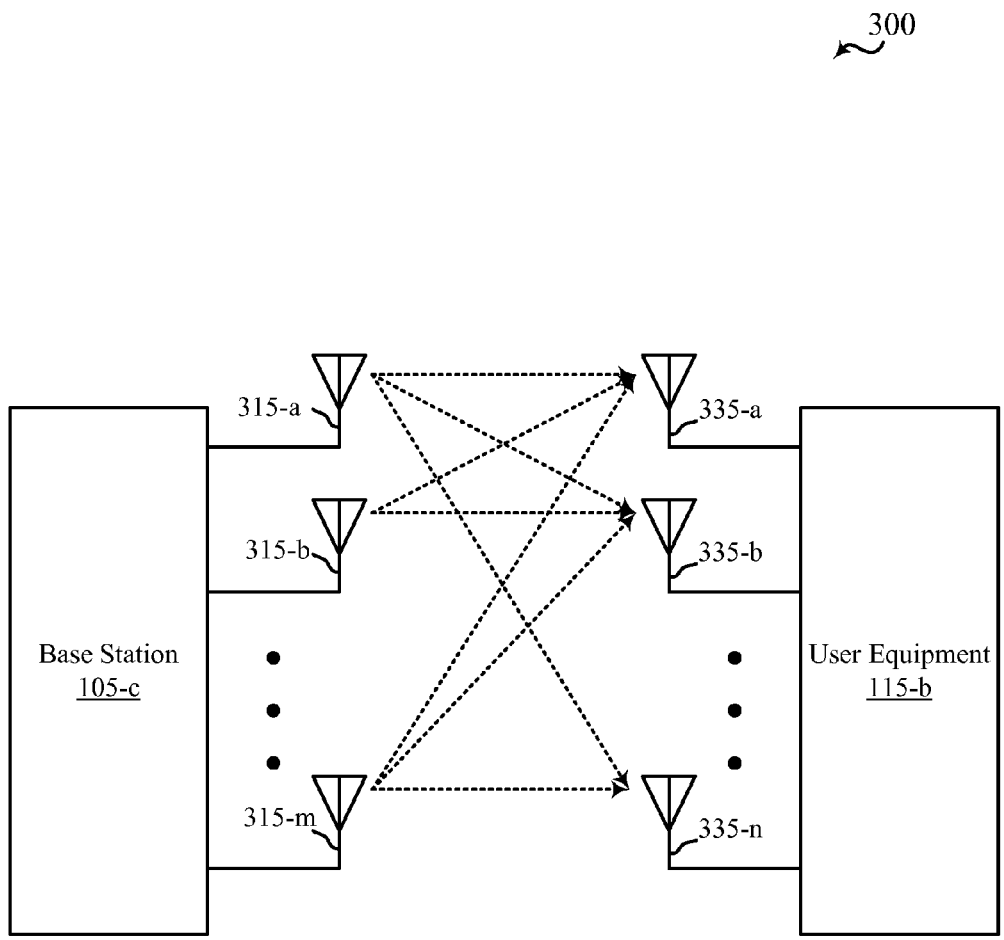
FIG. 3 illustrates an example of a wireless communications subsystem in accordance with various aspects of the present disclosure.

FIG. 3 is a diagram of a system 300 for selecting an optimal antenna subarray and directional beamforming vector from a codebook of beamforming vectors. System 300 includes a base station 105-c and a UE 115-b. In embodiments, base station 105-c may illustrate aspects of one of the base stations or eNBs 105 while the UE 115-b may illustrate aspects of the mobile devices or UEs 115 as described above with reference to FIGS. 1-2.

The base station 105-c may have M transmit antennas 315. The UE 115-b may have N receive antennas 335. System 300 may be used to employ diversity techniques such as transmit diversity, where multiple antennas (or antenna ports) transmit versions of a signal (e.g., delayed, coded, etc.) which maybe equalized at the receiver to provide diversity gain. The UE 115-b may also employ receive diversity, where signals from multiple antennas are combined to provide diversity gain. System 300 may employ MIMO techniques to increase diversity gain, array gain (e.g., beamforming, etc.), and/or spatial multiplexing gain.

In some examples of the present disclosure, the base station 105-c may include larger number of antennas 335 than UE 115-b. For example, transmit M antennas for the base station may be 8×8 or 8×16 planar array, while the UE 115-b may typically include 4 or 6 antenna subarrays for diversity reasons. Due to aperture considerations, each antenna subarray may typically include two (2) to eight (8) antennas. In some examples each UE antenna subarray 335 may point at a subset of physical angular regions. In some cases, a user holding the UE 115-b may block or interfere with one or more antenna subarrays 335 based on the position of the hand or other parts of the body. Hand blocking may adversely impact the signal quality of the receiver antennas 335.

In order to mitigate the impact of the hand/body blocking of antennas, the present disclosure provides a method for the UE 115-b to scan through a plurality of antenna subarrays 335 one at a time with a single beamforming vector transmitted by the base station 105-c to estimate the received SNR at a plurality of antenna subarrays 335. Based on the estimated SNR, the UE 115-b may select the best or ideal antenna subarray (e.g. antenna subarray 335-b) from a plurality of scanned antenna subarrays 335. For example, the UE 115-b may select an antenna subarray for which the received signal SNR is above a first SNR threshold. In some examples, the SNR threshold may be predetermined or adapted based on user preference or some other protocol considerations.

In some examples, for further performance improvement or for reducing the implementation complexity over the communication time frame, the UE 115-b can receive an additional signal from the millimeter wave base station, where the additional signal is beamformed on a plurality of beamforming vectors from a second codebook. The UE 115-b can then scan a plurality of beamforming vectors from the second codebook, and identify a second beamforming vector from the plurality of beamforming vectors from the second codebook based on the scanning.

In an instance where the received SNR is below the first threshold, the UE 115-*b* may further determine whether the received SNR is above or below a second threshold. In some cases, the UE 115-b may suggest the base station to scan through a coarse codebook of beamforming vectors as well as modifying its own scan through a coarse codebook of beamforming vectors to select a best beam from either codebook that results in a moderate link margin. However, if the received SNR is below the second threshold level, the UE 115-*b* may offer a fallback position to suggest the base station to scan through a finer codebook or a UE-specific codebook to refine the beam on which the received signals are modulated and also modify its own scan through a coarse/fine codebook of beamforming vectors to select the ideal beams based on the scan. Initiating the fallback procedures may result in slower discovery periods, but may offer improvement in the received signal quality.

Additionally or alternately, even in instances where the received signal is above the first threshold level, the UE 115-b may offer UE initiated on-demand service to refine the beamforming vectors, and thereby achieve higher link margin for the subsequent data phase. For example, the UE 115-b, upon determining that the initial received signal quality is above the first threshold, may nonetheless request scan of the coarse, intermediate or fine beamforming codebook in order improve the link margins between the base station 105-c and the UE 115-b.

Figure 4A:
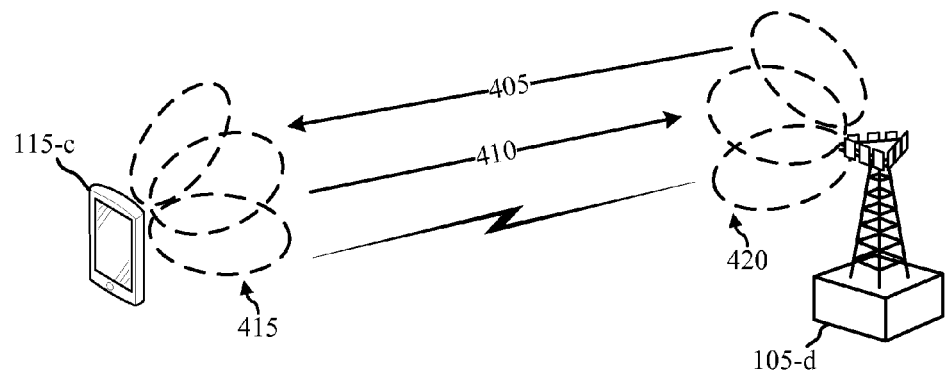
FIGS. 4A and 4B illustrate an example of a block diagram for beam shaping at a millimeter wireless device in accordance with various aspects of the present disclosure.
Figure 4B:
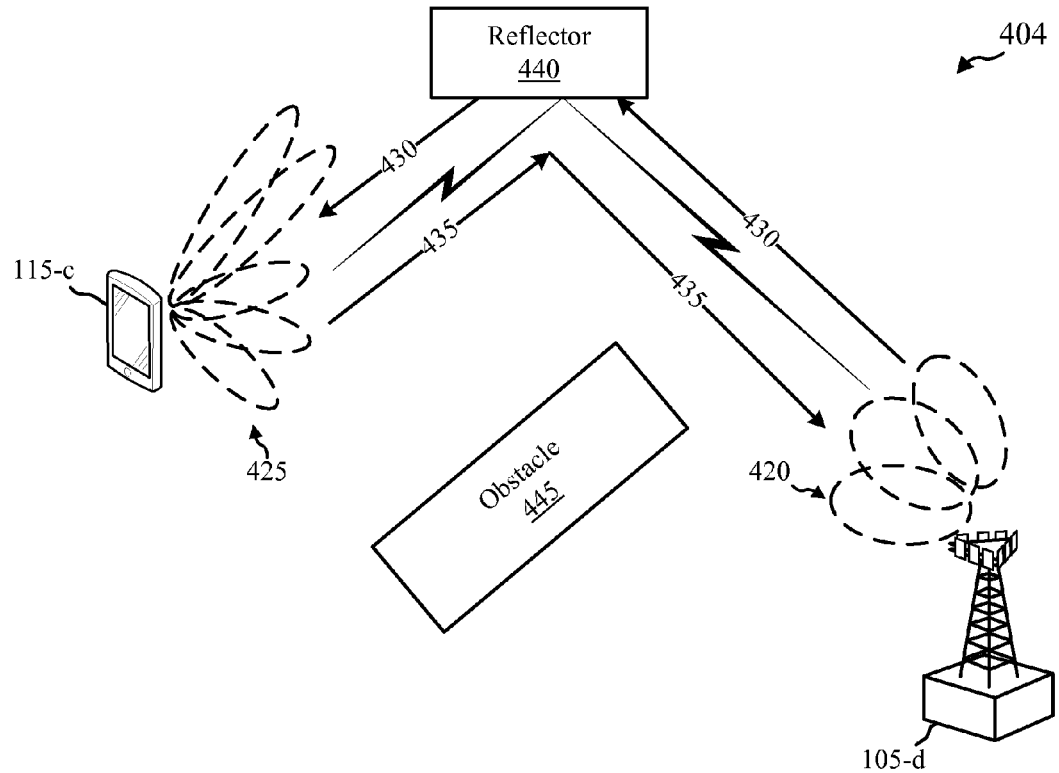

FIGS. 4A and 4B illustrate examples of situations in which the methods of the present disclosure may be implemented. Wireless communications subsystems 402 and 404 for beam shaping may include UEs 115-c, which may be an example of a UE 115 described above with reference to FIGS. 1-3. The wireless communications subsystems 402 and 404 may also include a base station 105-d, which may be an example of a base station 105 described above with reference to FIGS. 1-3.

Referring first to the example 402 illustrated in FIG. 4A, the UE 115-c may be in direct line of sight (LOS) of the base station 105-d communicating using default beam codebook (e.g., coarse codebook). The default beam codebook 420 may offer greater coverage in space with reduced power gain levels. However, since the UE 115-c is in the line of sight with the millimeter base station 105-d, utilization of the default beam codebook 420 may not significantly negatively impact the SNR of the signals received at the UE 115-c. As a result, the UE 115-c may also be configured to transmit and receive signals (i.e., control and data signals) using UE default codebook 415. In some examples, the base station 105-d may transmit a signal 405 during the UE discovery phase by using baseline candidate beamforming vectors. The baseline candidate beams may have a constant phase offset (CPO) across the number of antenna elements. Upon receiving the signal 405, the UE 115-c may determine that the SNR of the received signal is above an established SNR threshold. As a result, the UE 115-c may transmit a RACH 410 with SNR and beam information to the base station 105-d and establish data link communication between the base station 105-d and the UE 115-c. In some examples, the UE 115-c and the base station 105-d may make minor adjustments to the beam shape to improve link margins.

However, turning now to example 404 illustrated in FIG. 4B, the UE 115-c may be located outside the line of sight of the base station 105-d. For example, the UE 115-c may be located behind an obstacle 445 (e.g., building), and thus signal 430 transmitted by the base station 105-d may first be deflected off a reflector 440 (e.g., window of a building) prior to being received at the UE 115-c. As a result of the deflection, the quality of signal 430 received at the UE 115-c may be below an established SNR threshold. The signal quality may further be impacted by the utilization of the default beam codebook 420 that offers reduced power gains. Based on determining that the received signal 430 is below an established SNR threshold, the UE 115-c may select an alternate codebook 425 (e.g., intermediate or fine beam codebook) from a plurality of available beam codebooks. In one example, the UE 115-c may switch the UE codebook to a fine beam codebook 425 that offers higher power gains, and transmit a RACH signal 435 to the base station 105-d.

In one or more examples, the UE 115-c may select the alternate beam codebook based on incremental variations in the estimated SNR. For example, upon determining that the received signal 430 falls below a first SNR threshold, the UE 115-c may further determine whether the received signal 430 is above or below a second SNR threshold. In the event that the received signal 430 is below both the first SNR threshold and the second SNR threshold, the UE 115-c may select a fine beam codebook to improve link gains between the base station 105-d and the UE 115-c. In contrast, if the UE 115-c determines that the received signal 430 falls below a first SNR threshold, but is above a second SNR threshold, the UE 115-c may select an intermediate beam codebook. Based on the beam codebook selection, the UE 115-c may switch the UE 115-c beam codebook and also transmit a RACH signal 435 to the base station 105-d directing the base station 105-d to switch its base station codebook as well. In some examples, the RACH signal 435 may include SNR information and the selected beam information. In response to receiving the RACH signal 435, the base station 105-d may switch its beam codebooks to the beam codebook identified by the UE 115-d and transmit subsequent signals utilizing the updated beam codebook.

Figure 5:
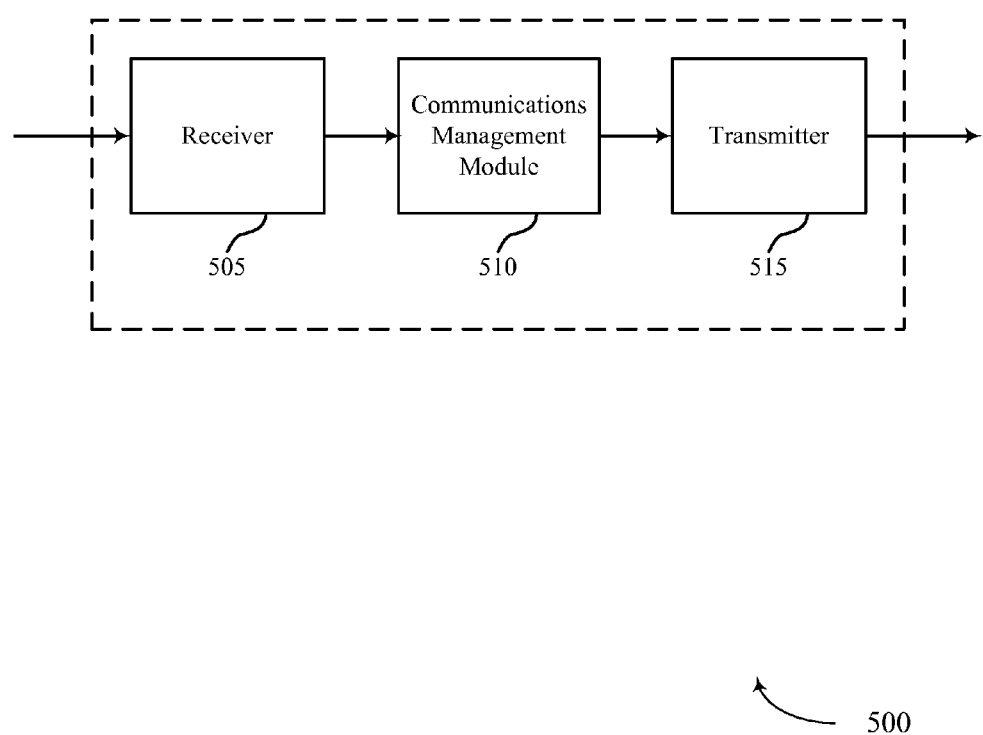
FIG. 5 shows a block diagram of a user equipment (UE) configured for beam shaping at a millimeter wave base station and/or fast selection of an antenna subarray at a wireless device in accordance with various aspects of the present disclosure.

FIG. 5 shows a block diagram of a wireless device 500 configured for beam shaping at a millimeter wave base station and/or fast selection of an antenna subarray at a wireless device in accordance with various aspects of the present disclosure. Wireless device 500 may be an example of aspects of a UE 115 described with reference to FIGS. 1-4. Wireless device 500 may include a receiver 505, a communication management module 510, or a transmitter 515. Wireless device 500 may also include a processor. Each of these components may be in communication with each other.

The components of wireless device 500 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to beam shaping and/or information related to antenna subarray selection at a millimeter wave base station and/or a wireless device, etc.). Information may be passed on to the communications management module 510, and to other components of wireless device 500.

The communications management module 510 may receive, at a wireless device, a first signal from a millimeter wave base station using a first beam codebook, dynamically determine that a second beam codebook, different from the first beam codebook, is to be used on the transmitted first signal, and transmit a second signal to the millimeter wave base station requesting the millimeter wave base station to use the second beam codebook. The communications management module 510 may also scan at least a portion of a plurality of antenna subarrays with a plurality of beamforming vectors from a subarray selection codebook to identify a quality of the first signal received at the portion of the plurality of antenna subarrays, and select an antenna subarray from the scanned portion of the plurality of antenna subarrays based at least in part on the identified quality of the first signal.

The transmitter 515 may transmit signals received from other components of wireless device 500. In some embodiments, the transmitter 515 may be collocated with the receiver 505 in a transceiver module. The transmitter 515 may include a single antenna, or it may include a plurality of antennas.

Figure 6:
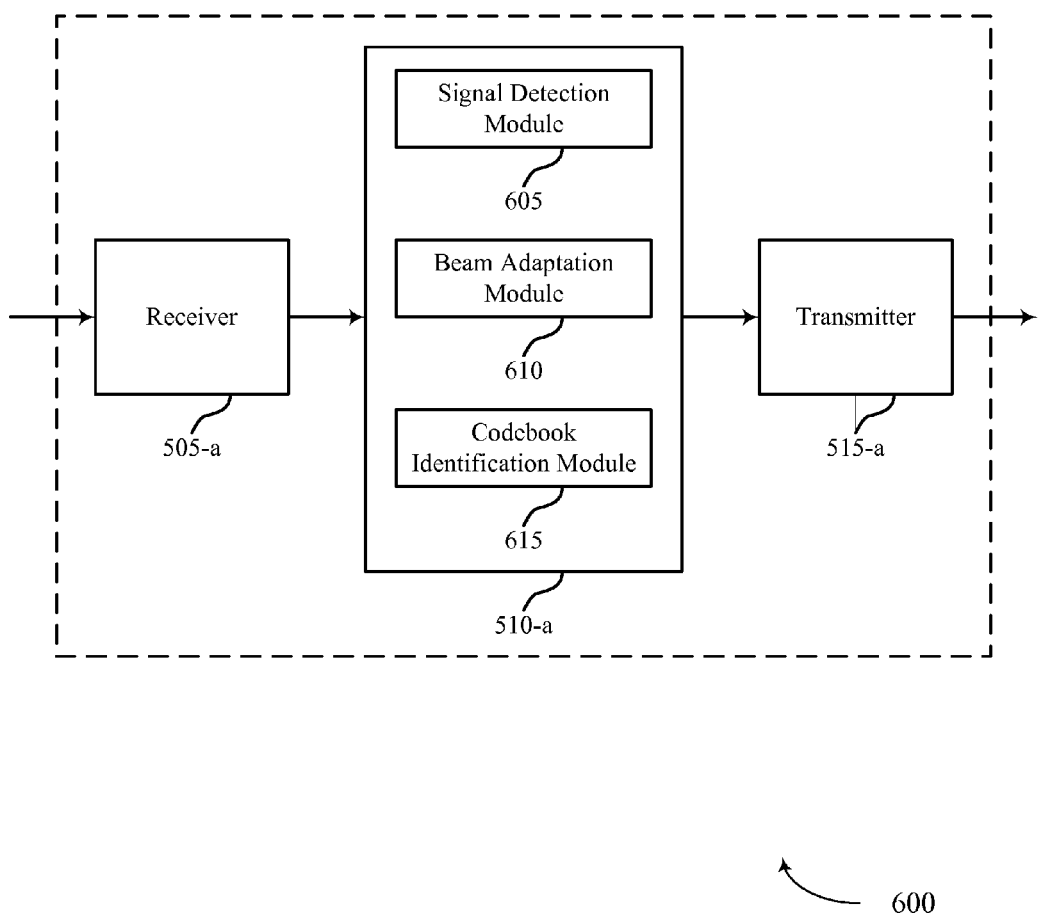
FIG. 6 shows a block diagram of a UE configured for beam shaping at a millimeter wave base station and a wireless device in accordance with various aspects of the present disclosure.

FIG. 6 shows a block diagram of a wireless device 600 configured for beam shaping at a millimeter wave base station and/or fast selection of an antenna subarray at a wireless device in accordance with various aspects of the present disclosure. Wireless device 600 may be an example of aspects of a wireless device 500 or a UE 115 described with reference to FIGS. 1-5. Wireless device 600 may include a receiver 505-a, a communication management module 510-a, or a transmitter 515-a. Wireless device 600 may also include a processor. Each of these components may be in communication with each other. The communication management module 510-a may also include a signal detection module 605, a beam adaptation module 610, and a codebook identification module 615.

The components of wireless device 600 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-a may receive information which may be passed on to communication management module 510-a, and to other components of UE. The communication management module 510-a may perform the operations described above with reference to FIG. 5. The transmitter 515-a may transmit signals received from other components of wireless device 600.

The signal detection module 605 may receive, at a wireless device, a first signal from a millimeter wave base station using a first beam codebook as described above with reference to FIGS. 2-4. The signal detection module 605 may also identify a first receiver beam codebook used at the wireless device as being associated with the first beam codebook used by the millimeter wave base station. In some examples, the first signal may be a directional primary synchronization signal (DPSS).

The beam adaptation module 610 may dynamically determine that a second beam codebook, different from the first beam codebook, is to be used on the transmitted first signal as described above with reference to FIGS. 2-4. The beam adaptation module 610 may also switch from the first receiver beam codebook to a second receiver beam codebook associated with the second beam codebook used by the millimeter wave base station. In some examples, the second beam codebook may be selected in response to determining that the quality of signal falls below the first threshold. In some examples, the first beam codebook may be a coarse codebook and the second beam codebook may be selected from a group comprising at least one of a pseudo-omni beam pattern codebook, an antenna selection codebook, a coarse codebook of broad beams, an intermediate codebook of slightly narrower beams, a fine codebook of narrowest beams, a wireless-device specific codebook based on prior information at the millimeter wave base station about the wireless device, a beam negation codebook such as a codebook of beams optimally designed to minimize interference due to simultaneous coordinated transmissions to multiple wireless devices, a codebook of beams trading off signal quality to a specific wireless device at the cost of interference to other wireless devices, or a combination of beamforming vectors from different codebooks.

The codebook identification module 615 may transmit a second signal to the millimeter wave base station requesting the millimeter wave base station to use the second beam codebook as described above with reference to FIGS. 2-4. The codebook identification module 615 may also transmit the second signal to the millimeter wave base station identifying the selected second beam codebook. In some examples, the second signal comprises a request for the millimeter wave base station to switch to a second beam codebook. In some examples, the request can be based at least in part on hardware and/or software complexity issues for the radio frequency chains (e.g. phase shifters, analog-to-digital converters, up/down converters and/or mixers, digital-to-analog converters, radio frequency circuitry needed to establish the links, and the like), maintenance of link issues, and/or performance improvements with metrics such as rate, reliability, or a combination thereof. The codebook identification module 615 may also transmit the second signal via a random access channel (RACH) using a coarse codebook. The codebook identification module 615 may also transmit the second signal over a low-frequency carrier network coexisting with a millimeter wave carrier network. In some examples, the second signal comprises a distress signal transmitted with a unique identification at a high code rate.

Figure 7:
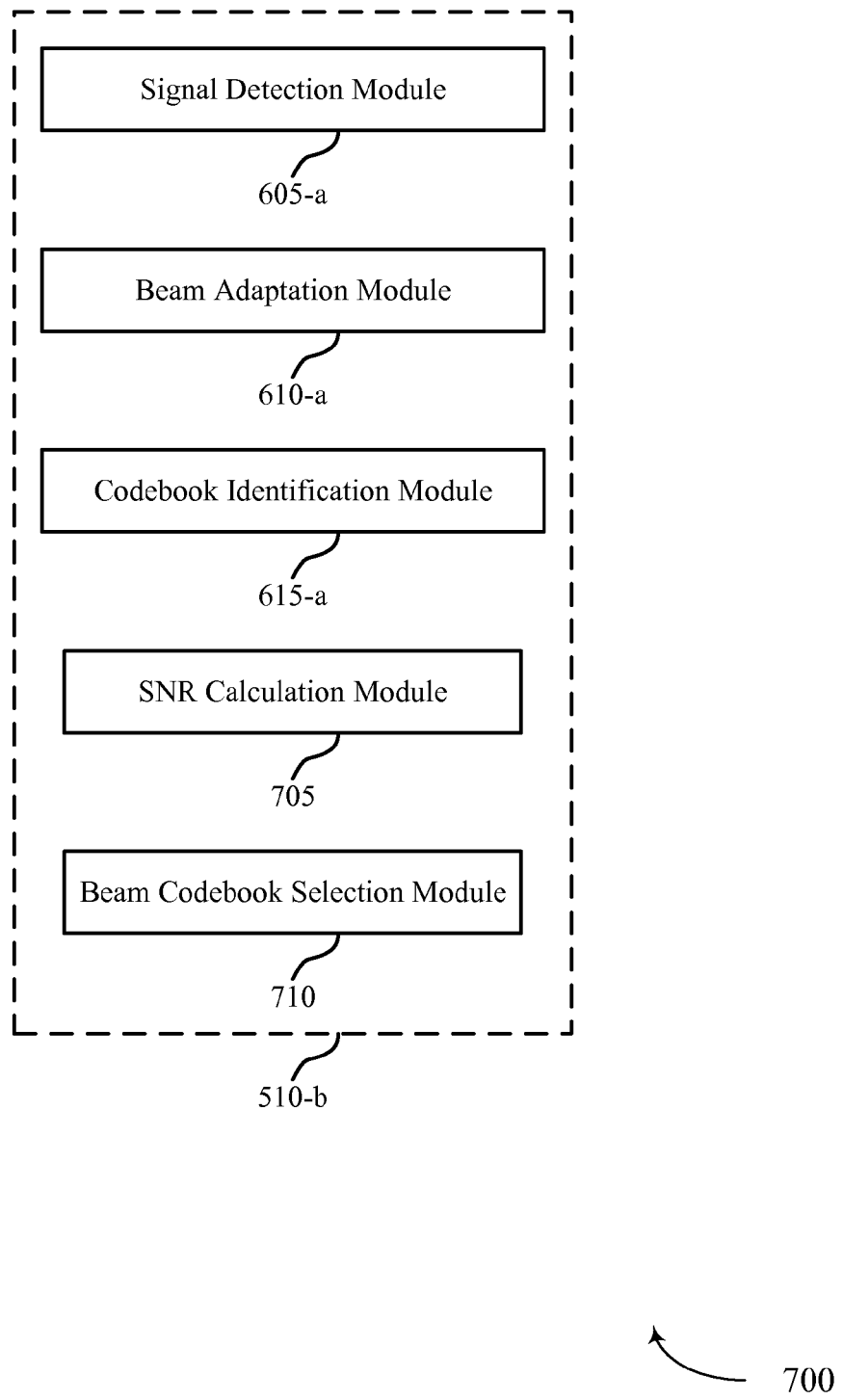
FIG. 7 shows a block diagram of a communications management module configured for beam shaping at a millimeter wave base station and a wireless device in accordance with various aspects of the present disclosure.

FIG. 7 shows a block diagram 700 of a communications management module 510-b which may be a component of a wireless device 500 or a wireless device 600 configured for beam shaping at a millimeter wave base station and/or fast selection of an antenna subarray at a wireless device in accordance with various aspects of the present disclosure. The communications management module 510-b may be an example of aspects of a communications management module 510 described with reference to FIGS. 5-6. The communications management module 510-b may include a signal detection module 605-a, a beam adaptation module 610-a, and a codebook identification module 615-a. Each of these modules may perform the functions described above with reference to FIG. 6. The communications management module 510-b may also include a signal-to-noise ratio (SNR) calculation module 705, and a beam codebook selection module 710.

The components of the communications management module 510-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The SNR calculation module 705 may determine whether a quality of the received first signal is above or below a first threshold as described above with reference to FIGS. 2-4. The SNR calculation module 705 may also determine whether the quality of the first signal is above or below a second threshold. The SNR calculation module 705 may also calculate a signal-to-noise ratio (SNR) of the first signal to determine a quality of the first signal.

The beam codebook selection module 710 may dynamically select the second beam codebook based at least in part on the determining as described above with reference to FIGS. 2-4. The beam codebook selection module 710 may also dynamically select the second beam codebook based at least in part on the determining.

Figure 8:
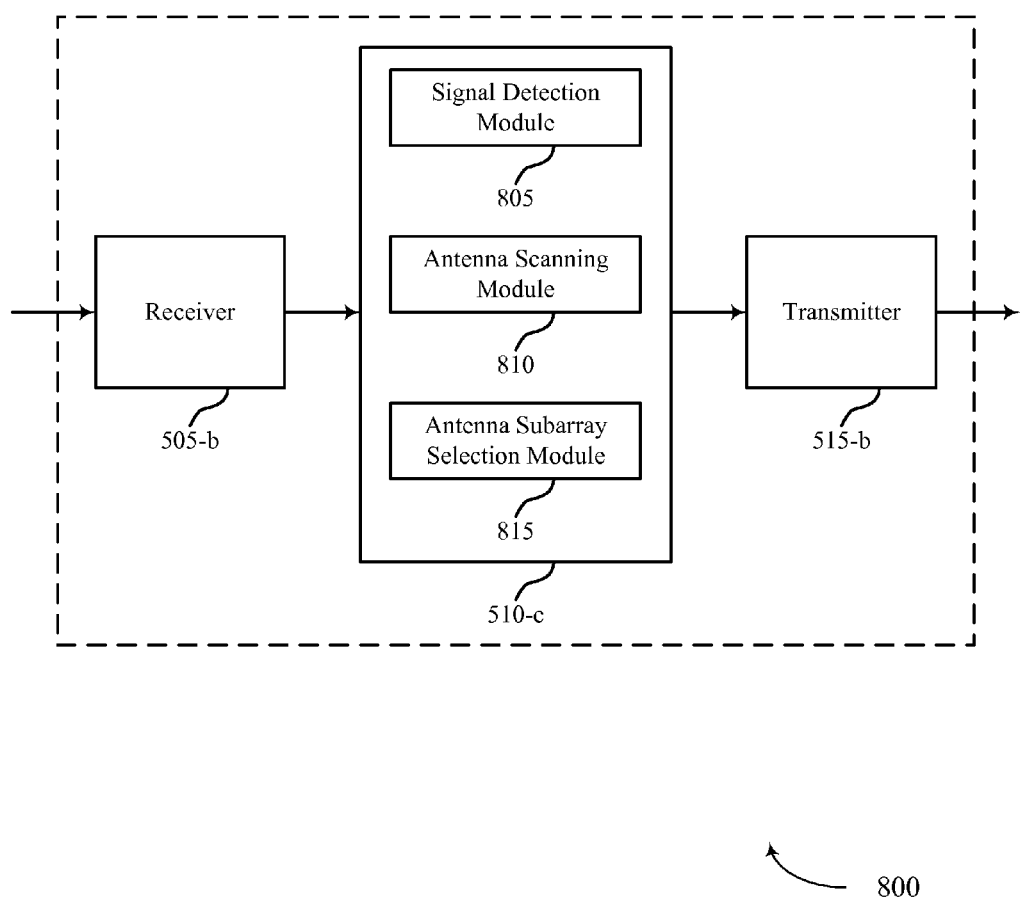
FIG. 8 shows a block diagram of a UE configured for fast selection of an antenna subarray and beamforming for millimeter wave wireless connections in accordance with various aspects of the present disclosure.

FIG. 8 shows a block diagram of a wireless device 800 configured for beam shaping at a millimeter wave base station and/or fast selection of an antenna subarray at a wireless device in accordance with various aspects of the present disclosure. Wireless device 800 may be an example of aspects of a wireless device 500, a wireless device 600, or a UE 115 described with reference to FIGS. 1-4, and 15. Wireless device 800 may include a receiver 505-b, a communication management module 510-c, or a transmitter 515-b. Wireless device 800 may also include a processor. Each of these components may be in communication with each other. The communication management module 510-c may also include a signal detection module 805, an antenna scanning module 810, and an antenna subarray selection module 815.

The components of wireless device 800 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-b may receive information which may be passed on to communication management module 510-c, and to other components of UE 115. The communication management module 510-c may perform the operations described above with reference to FIG. 5. The transmitter 515-b may transmit signals received from other components of wireless device 800.

The signal detection module 805 may receive, at a wireless device, one or more signals from a millimeter wave base station as described above with reference to FIGS. 2-4. In some examples, a received signal may be a directional primary synchronization signal (DPSS).

The antenna scanning module 810 may scan at least a portion of a plurality of antenna subarrays with a plurality of beamforming vectors from a subarray selection codebook to identify a quality of the first signal received at the portion of the plurality of antenna subarrays as described above with reference to FIGS. 2-4.

The antenna subarray selection module 815 may select an antenna subarray from the scanned portion of the plurality of antenna subarrays based at least in part on the identified quality of the first signal as described above with reference to FIGS. 2-4. The selection may include a coarse codebook of broad beams covering a wide beamspace area optimally designed to minimize the wireless device discovery latency at the cost of peak beamforming gain. The selection may also include an intermediate codebook of slightly narrower beams covering a smaller beamspace area and corresponding to another point in the tradeoff curve between wireless device discovery latency and peak beamforming gain. The selection may also include a fine codebook of the narrowest beams covering the smallest beamspace area and corresponding to the highest peak beamforming gain. The selection may also include a codebook appropriately designed to mitigate near-field impairments at the wireless device. The selection may also include a codebook with a special structure appropriately designed to assist in channel estimation tasks at the wireless device. The selection may also include a codebook with a special structure appropriately designed to assist in radio-frequency design, reduce system complexity or cost. The selection may also include any combination of beamforming vectors from different codebooks thereof.

Figure 9:
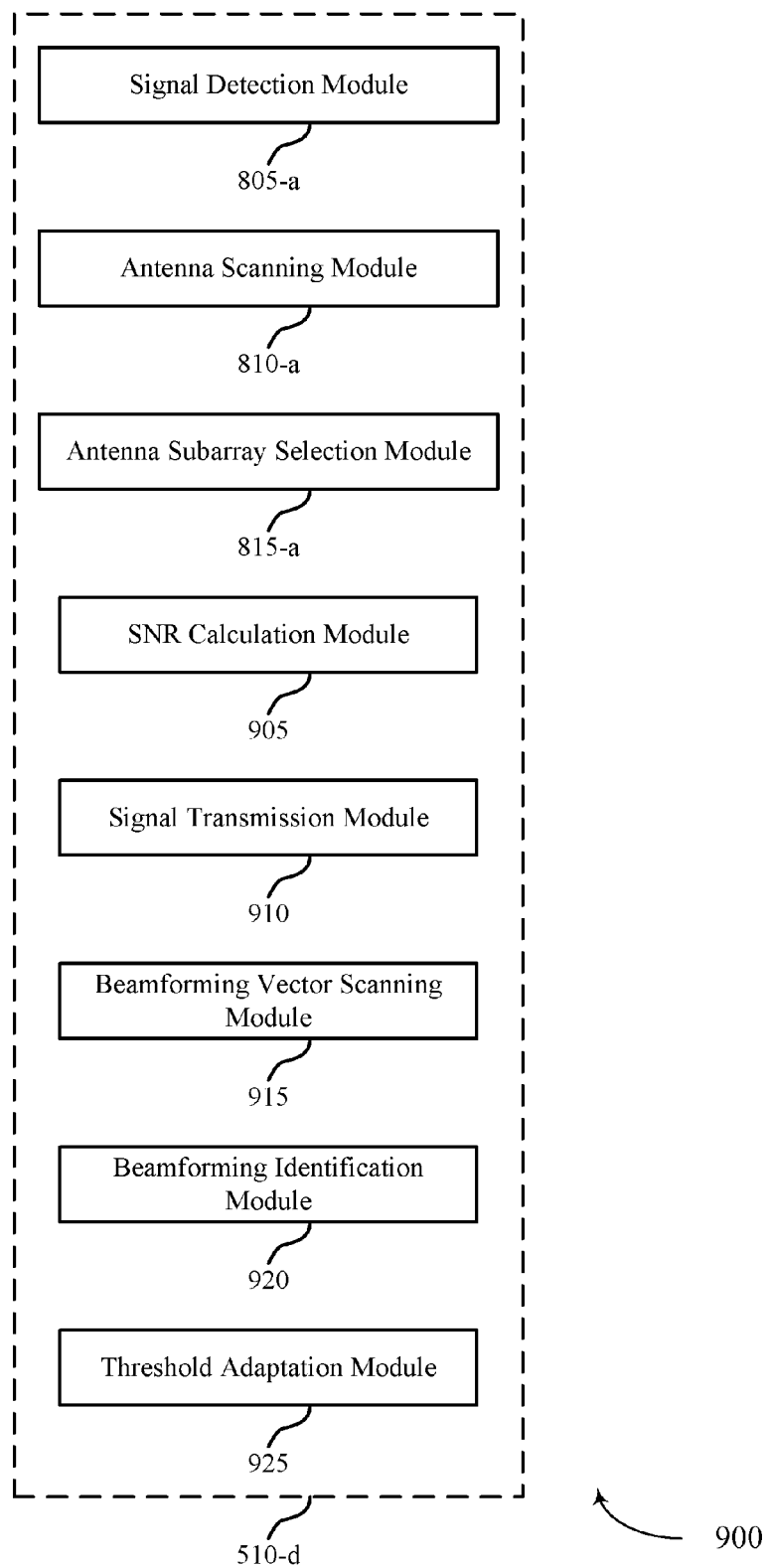
FIG. 9 shows a block diagram of a communication management module configured for fast selection of an antenna subarray and beamforming for millimeter wave wireless connections in accordance with various aspects of the present disclosure.

FIG. 9 shows a block diagram 900 of a communications management module 510-c which may be a component of a wireless device 500, a wireless device 600, or a wireless device 800 configured for beam shaping at a millimeter wave base station and/or fast selection of an antenna subarray at a wireless device in accordance with various aspects of the present disclosure. The communications management module 510-c may be an example of aspects of a communications management module 510 described with reference to FIGS. 5-8. The communications management module 510-c may include a signal detection module 805-a, an antenna scanning module 810-a, and an antenna subarray selection module 815-a. Each of these modules may perform the functions described above with reference to FIG. 8. The communications management module 510-c may also include a signal-to-noise ratio (SNR) calculation module 905, a signal transmission module 910, a beamforming vector scanning module 915, a beamforming identification module 920, and a threshold adaptation module 925.

The components of the communications management module 510-c may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The SNR calculation module 905 may determine whether the quality of the first signal at the selected antenna subarray is above or below a first threshold as described above with reference to FIGS. 2-4. The SNR calculation module 905 may also determine that the quality of the first signal at the selected antenna subarray is below a second threshold. The SNR calculation module 905 may also calculate a signal-to-noise ratio of the first signal to determine the quality of the first signal.

The signal transmission module 910 may transmit a second signal to the millimeter wave base station based at least in part on the determining as described above with reference to FIGS. 2-4. The signal transmission module 910 may also transmit the second signal via a RACH. The signal transmission module 910 may also transmit the second signal over a low-frequency carrier network coexisting with a millimeter wave carrier network, and/or may transmit the second signal via a highly-coded low-rate channel/network already established with a unique identification number. In some examples, the second signal comprises a signal energy estimate, a beamforming vector index, information for beamforming, or a combination thereof.

The beamforming vector scanning module 915 may scan a plurality of beamforming vectors from a coarse codebook upon determining that the quality of the first signal at the selected antenna subarray is below the first threshold as described above with reference to FIGS. 2-4.

The beamforming identification module 920 may identify a first beamforming vector from the plurality of beamforming vectors based at least in part on the scanning as described above with reference to FIGS. 2-4. The beamforming identification module 920 may also identify a beamforming vector from the plurality of beamforming vectors based at least in part on the determining, wherein the beamforming vector is identified from a fine codebook or a wireless device specific codebook.

The threshold adaptation module 925 may adapt the first threshold based at least in part on a selection of a beamforming vector by the wireless device as described above with reference to FIGS. 2-4.

Figure 10:
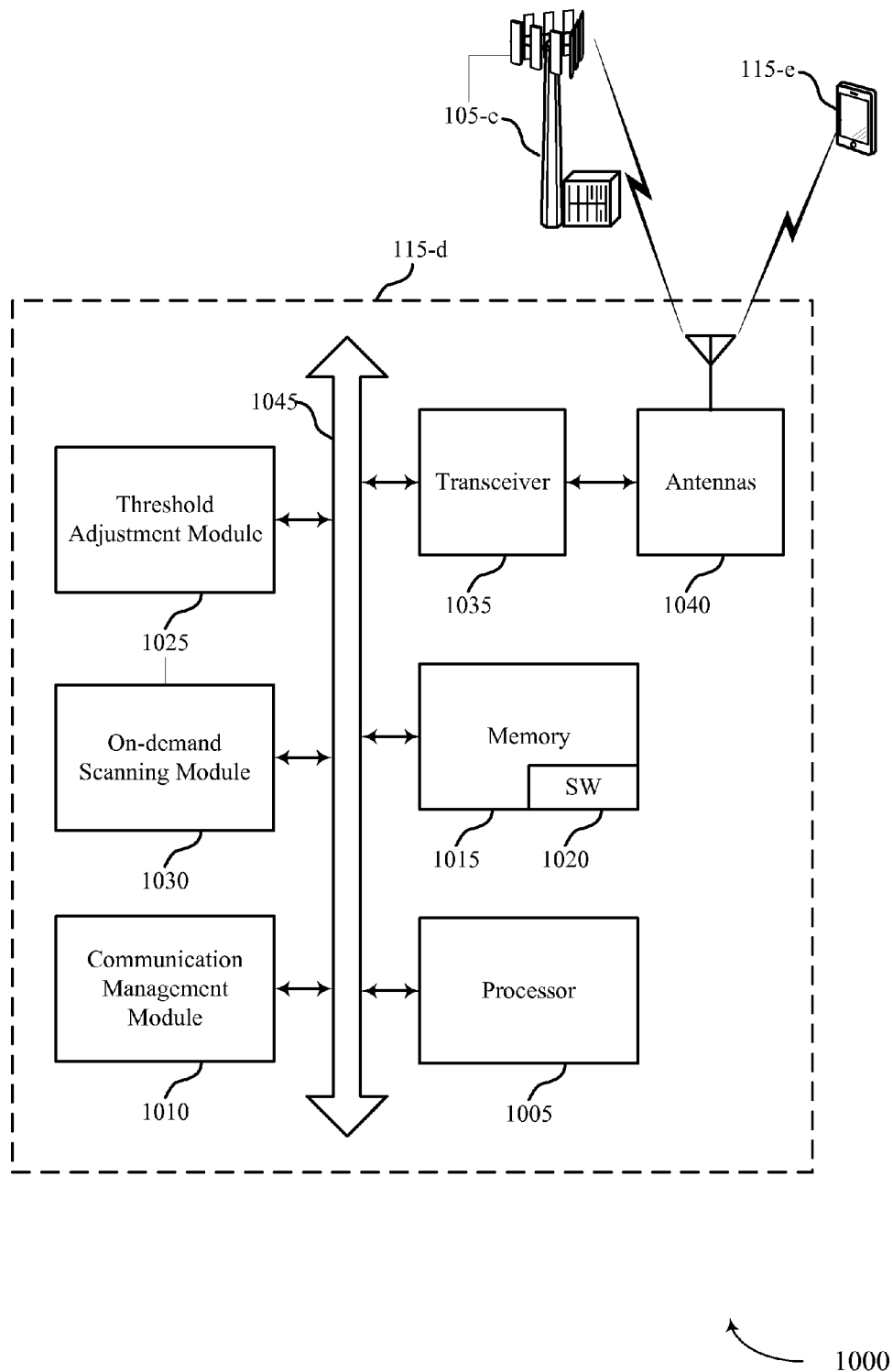
FIG. 10 illustrates a block diagram of a system including a UE configured for beam shaping at a millimeter wave base station and/or fast selection of an antenna subarray at a wireless device in accordance with various aspects of the present disclosure.

FIG. 10 shows a diagram of a system 1000 including a UE 115-d configured for beam shaping at a millimeter wave base station and/or fast selection of an antenna subarray at a wireless device in accordance with various aspects of the present disclosure. System 1000 may include UE 115-d, which may be an example of a wireless device 500, a wireless device 600, a wireless device 800, or a UE 115 described above with reference to FIGS. 1-4. UE 115-d may include a communication management module 1010, which may be an example of a communication management module 510 described with reference to FIGS. 5-9. UE 115-d may also include a threshold adjustment module 1025. UE 115-d may also include components for bi-directional voice and data communications including components for transmitting communications and components for receiving communications. For example, UE 115-d may communicate bi-directionally with base station 105-e or UE 115-e.

The threshold adjustment module 1025 may adapt the first or second SNR threshold levels as described above with reference to FIGS. 2-4. UE 115-d may also include a processor module 1005, and memory 1015 (including software (SW) 1020, a transceiver module 1035, and one or more antenna(s) 1040, each of which may communicate, directly or indirectly, with one another (e.g., via buses 1045). The transceiver module 1035 may communicate bi-directionally, via the antenna(s) 1040 or wired or wireless links, with one or more networks, as described above. For example, the transceiver module 1035 may communicate bi-directionally with a base station 105 or another UE 115. The transceiver module 1035 may include a modem to modulate the packets and provide the modulated packets to the antenna(s) 1040 for transmission, and to demodulate packets received from the antenna(s) 1040. While UE 115-d may include a single antenna 1040, UE 115-d may also have multiple antennas 1040 capable of concurrently transmitting or receiving multiple wireless transmissions.

The on-demand scanning module 1030 may initiate an on-demand search to identify a second beamforming vector from a plurality of beamforming vectors at the millimeter wave base station, wherein the second beamforming vector is identified from a group comprising a pseudo-omni beam pattern codebook, an antenna selection codebook, a coarse codebook, an intermediate codebook, a fine codebook, a near-field impairment mitigation codebook, a channel estimation codebook, a complexity reduction codebook, or a wireless device specific codebook, as described above with reference to FIGS. 2-4.

The memory 1015 may include random access memory (RAM) and read only memory (ROM). The memory 1015 may store computer-readable, computer-executable software/firmware code 1020 including instructions that, when executed, cause the processor module 1005 to perform various functions described herein (e.g., Techniques for beam shaping at a millimeter wave base station and a wireless device, etc.). Alternately, the software/firmware code 1020 may not be directly executable by the processor module 1005 but cause a computer (e.g., when compiled and executed) to perform functions described herein. The processor module 1005 may include an intelligent hardware device, (e.g., a central processing unit (CPU), a microcontroller, an ASIC, etc.)

Figure 11:
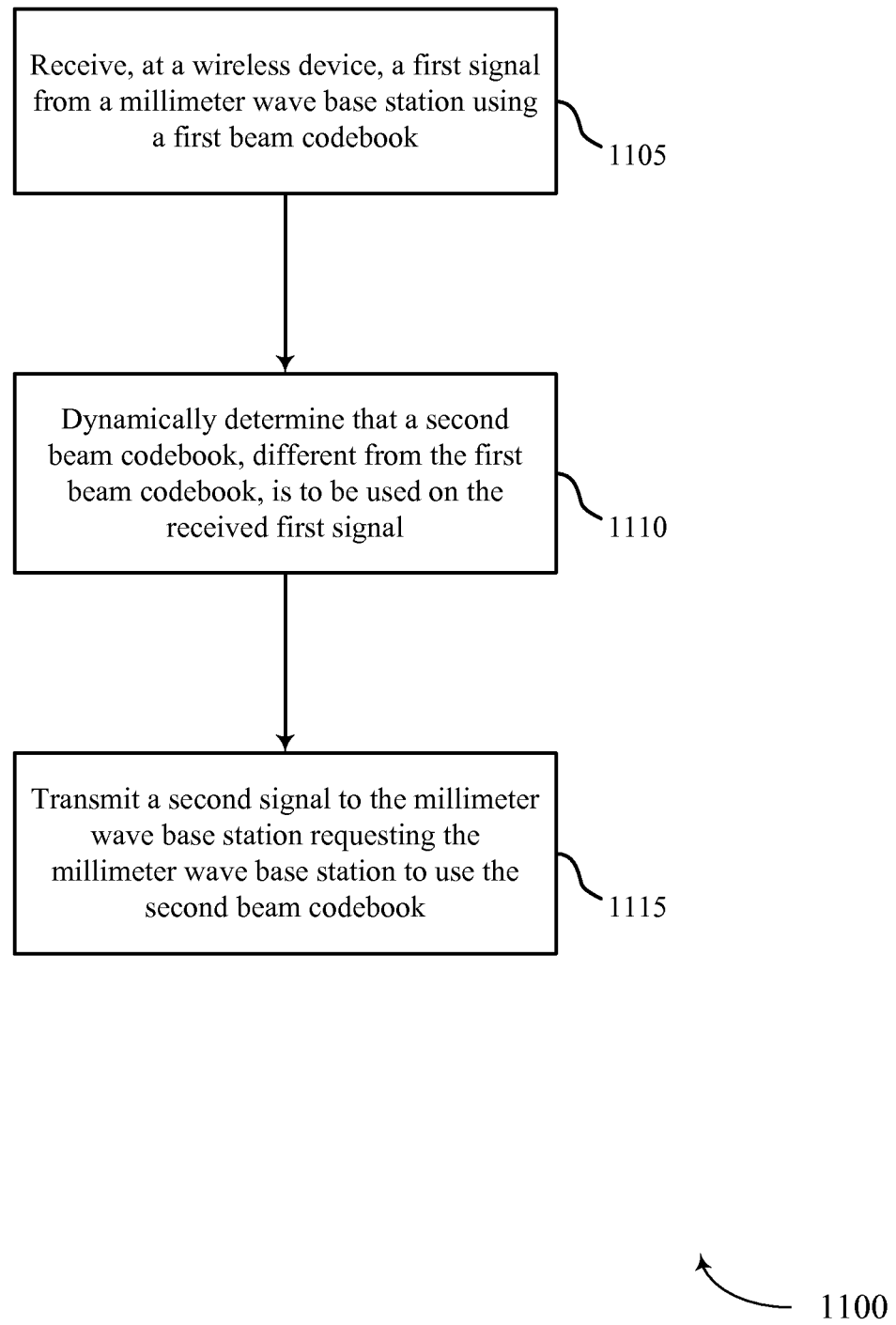
FIG. 11 shows a flowchart illustrating a method for beam shaping at a millimeter wave base station and a wireless device in accordance with various aspects of the present disclosure.

FIG. 11 shows a flowchart illustrating a method 1100 for beam shaping at a millimeter wave base station and a wireless device in accordance with various aspects of the present disclosure. The operations of method 1100 may be implemented by a UE 115 or its components as described with reference to FIGS. 1-10. For example, the operations of method 1100 may be performed by a communication management modules 510 or 1010 as described with reference to FIGS. 5-10. In some examples, a UE 115 may execute a set of codes to control the functional elements of the UE 115 to perform the functions described below. Additionally or alternatively, the UE 115 may perform aspects the functions described below using special-purpose hardware.

At block 1105, the UE 115 may receive, at a wireless device, a first signal from a millimeter wave base station using a first beam codebook as described above with reference to FIGS. 2-4. In certain examples, the operations of block 1105 may be performed by the signal detection module 605 as described above with reference to FIGS. 6 and 7.

At block 1110, the UE 115 may dynamically determine that a second beam codebook, different from the first beam codebook, is to be used on the transmitted first signal as described above with reference to FIGS. 2-4. In certain examples, the operations of block 1110 may be performed by the beam adaptation module 610 as described above with reference to FIGS. 6 and 7.

At block 1115, the UE 115 may transmit a second signal to the millimeter wave base station requesting the millimeter wave base station to use the second beam codebook as described above with reference to FIGS. 2-4. In certain examples, the operations of block 1115 may be performed by the codebook identification module 615 as described above with reference to FIGS. 6 and 7.

Figure 12:
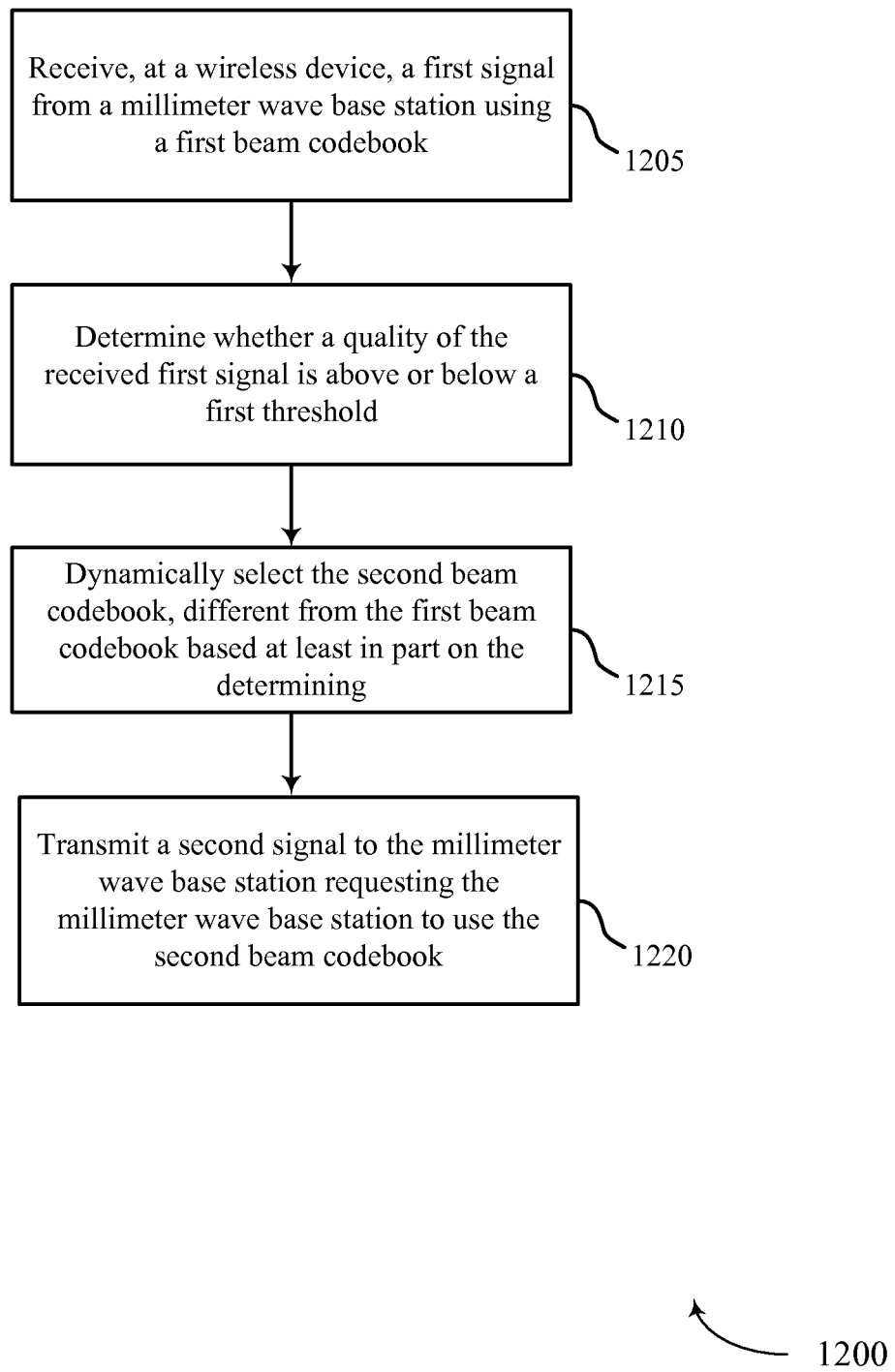
FIG. 12 shows a flowchart illustrating a method for beam shaping at a millimeter wave base station and a wireless device in accordance with various aspects of the present disclosure.

FIG. 12 shows a flowchart illustrating a method 1200 for beam shaping at a millimeter wave base station and a wireless device in accordance with various aspects of the present disclosure. The operations of method 1200 may be implemented by a UE 115 or its components as described with reference to FIGS. 1-10. For example, the operations of method 1200 may be performed by a communications management module 510 or 1010 as described with reference to FIGS. 5-10. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of method 1100 of FIG. 11.

At block 1205, the UE 115 may receive, at a wireless device, a first signal from a millimeter wave base station using a first beam codebook as described above with reference to FIGS. 2-4. In certain examples, the operations of block 1205 may be performed by the signal detection module 605 as described above with reference to FIGS. 6 and 7.

At block 1210, the UE 115 may determine whether a quality of the received first signal is above or below a first threshold as described above with reference to FIGS. 2-4. In certain examples, the operations of block 1110 may be performed by the SNR calculation module 705 as described above with reference to FIG. 7.

At block 1215, the UE 115 may dynamically select the second beam codebook, different from the first beam codebook based at least in part on the determining as described above with reference to FIGS. 2-4. In certain examples, the operations of block 1215 may be performed by the beam codebook selection module 710 as described above with reference to FIG. 8.

At block 1220, the UE 115 may transmit a second signal to the millimeter wave base station requesting the millimeter wave base station to use the second beam codebook as described above with reference to FIGS. 2-4. In certain examples, the operations of block 1220 may be performed by the codebook identification module 615 as described above with reference to FIGS. 6 and 7.

Figure 13:
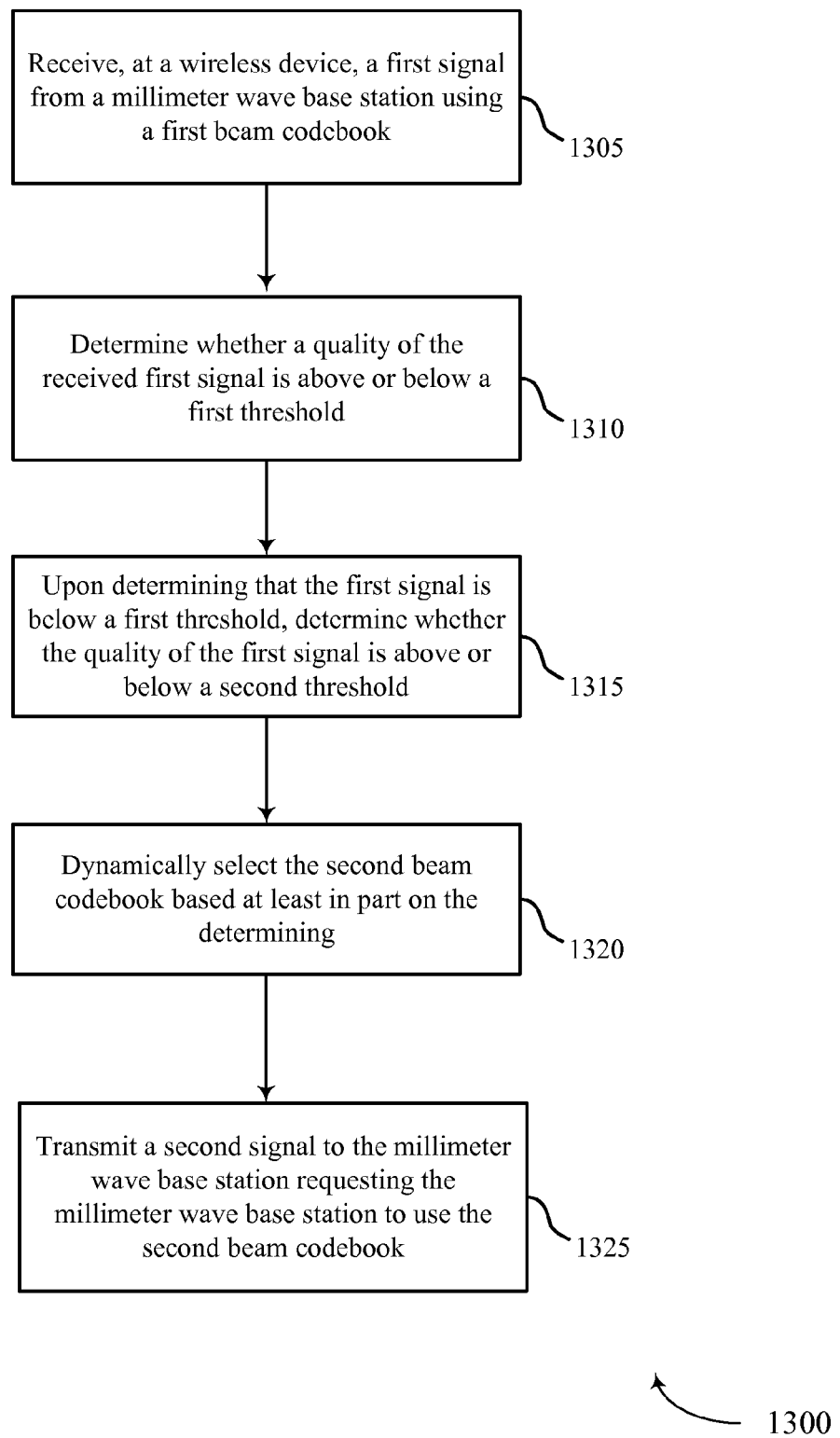
FIG. 13 shows a flowchart illustrating a method for beam shaping at a millimeter wave base station and a wireless device in accordance with various aspects of the present disclosure.

FIG. 13 shows a flowchart illustrating a method 1300 for beam shaping at a millimeter wave base station and a wireless device in accordance with various aspects of the present disclosure. The operations of method 1300 may be implemented by a UE 115 or its components as described with reference to FIGS. 1-10. For example, the operations of method 1300 may be performed by a communications management module 510 or 1010 as described with reference to FIGS. 5-10. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1100, and 1200 of FIGS. 11-12.

At block 1305, the UE 115 may receive, at a wireless device, a first signal from a millimeter wave base station using a first beam codebook as described above with reference to FIGS. 2-4. In certain examples, the operations of block 1305 may be performed by the signal detection module 605 as described above with reference to FIGS. 6 and 7.

At block 1310, the UE 115 may determine whether the quality of the first signal is above or below a second threshold as described above with reference to FIGS. 2-4. In certain examples, the operations of block 1310 may be performed by the SNR calculation module 705 as described above with reference to FIG. 7.

At block 1315, the UE 115, upon determining that the first signal is below a first threshold, may determine whether the quality of the first signal is above or below a second threshold as described above with reference to FIGS. 2-4. In certain examples, the operations of block 1315 may be performed by the SNR calculation module 705 as described above with reference to FIG. 7.

At block 1320, the UE 115 may dynamically select the second beam codebook based at least in part on the determining as described above with reference to FIGS. 2-4. In certain examples, the operations of block 1320 may be performed by the beam codebook selection module 710 as described above with reference to FIG. 7.

At block 1325, the UE 115 may transmit a second signal to the millimeter wave base station requesting the millimeter wave base station to use the second beam codebook as described above with reference to FIGS. 2-4. In certain examples, the operations of block 1315 may be performed by the codebook identification module 615 as described above with reference to FIGS. 6 and 7.

Figure 14:
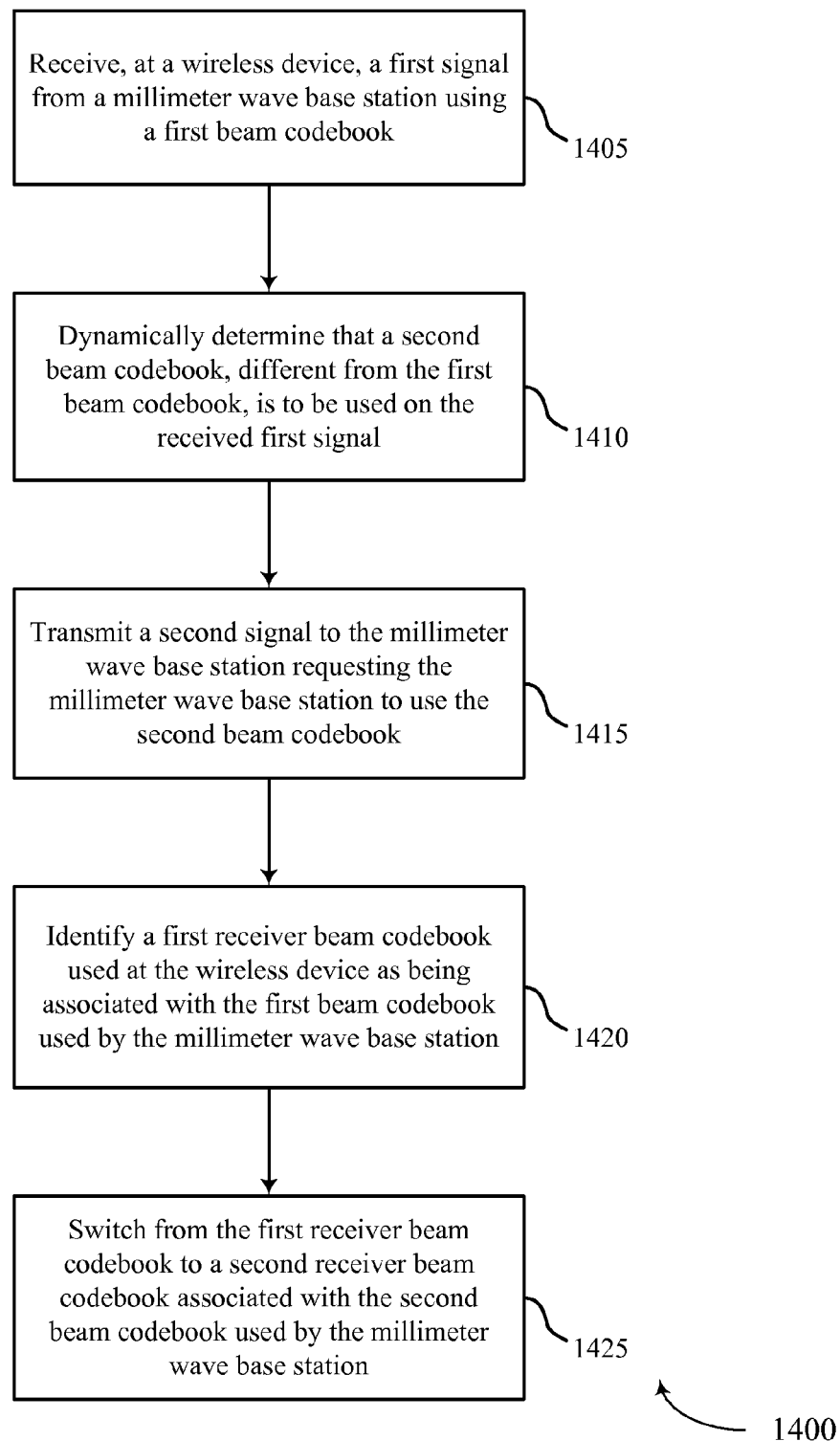
FIG. 14 shows a flowchart illustrating a method for beam shaping at a millimeter wave base station and a wireless device in accordance with various aspects of the present disclosure.

FIG. 14 shows a flowchart illustrating a method 1400 for beam shaping at a millimeter wave base station and a wireless device in accordance with various aspects of the present disclosure. The operations of method 1400 may be implemented by a UE 115 or its components as described with reference to FIGS. 1-10. For example, the operations of method 1400 may be performed by a communication management module 510 or 1010 as described with reference to FIGS. 5-10. In some examples, a UE 115 may execute a set of codes to control the functional elements of the UE 115 to perform the functions described below. Additionally or alternately, the UE 115 may perform aspects the functions described below using special-purpose hardware. The method 1400 may also incorporate aspects of methods 1100, 1200, and 1300 of FIGS. 11-13.

At block 1405, the UE 115 may receive, at a wireless device, a first signal from a millimeter wave base station using a first beam codebook as described above with reference to FIGS. 2-4. In certain examples, the operations of block 1405 may be performed by the signal detection module 605 as described above with reference to FIGS. 6 and 7.

At block 1410, the UE 115 may dynamically determine that a second beam codebook, different from the first beam codebook, is to be used on the received first signal as described above with reference to FIGS. 2-4. In certain examples, the operations of block 1410 may be performed by the beam adaptation module 610 as described above with reference to FIGS. 6 and 7.

At block 1415, the UE 115 may transmit a second signal to the millimeter wave base station requesting the millimeter wave base station to use the second beam codebook as described above with reference to FIGS. 2-4. In certain examples, the operations of block 1415 may be performed by the codebook identification module 615 as described above with reference to FIGS. 6 and 7.

At block 1420, the UE 115 may identify a first receiver beam codebook used at the wireless device as being associated with the first beam codebook used by the millimeter wave base station as described above with reference to FIGS. 2-4. In certain examples, the operations of block 1420 may be performed by the signal detection module 605 as described above with reference to FIGS. 6 and 7.

At block 1425, the UE 115 may switch from the first receiver beam codebook to a second receiver beam codebook associated with the second beam codebook used by the millimeter wave base station as described above with reference to FIGS. 2-4. In certain examples, the operations of block 1425 may be performed by the beam adaptation module 610 as described above with reference to FIGS. 6 and 7.

Thus, methods 1100, 1200, 1300, and 1400 may provide for beam shaping at a millimeter wave base station and a wireless device. It should be noted that methods 1100, 1200, 1300, and 1400 describe possible implementation, and that the operations and the steps may be rearranged or otherwise modified such that other implementations are possible. In some examples, aspects from two or more of the methods 1100, 1200, 1300, and 1400 may be combined.

Figure 15:
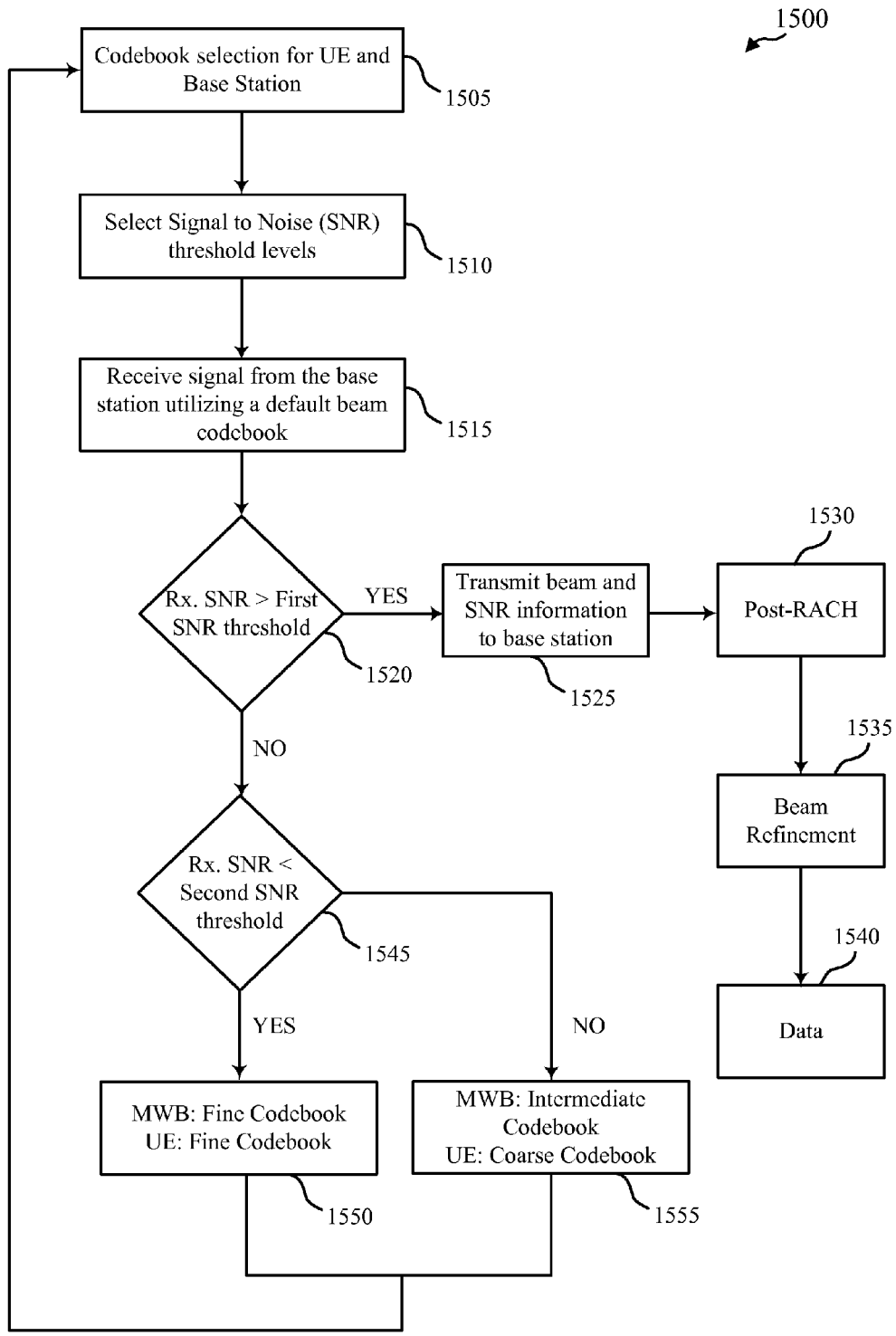
FIG. 15 illustrates an example of a process flow for beam shaping at a millimeter wave base station and a wireless device in accordance with various aspects of the present disclosure.

FIG. 15 illustrates an example of a process flow 1500 for beam shaping at a millimeter wave base station and a wireless device in accordance with various aspects of the present disclosure. Process flow 1500 may be executed by a UE 115 or base station 105, which may be an example of a UE 115 or base station 105 described above with reference to FIGS. 1-4.

At block 1505, millimeter wave base station and the UE may select default beam codebooks to transmit and receive signals. In some examples, the base station and the UE may start with coarsest codebook on either side. At block 1510, the base station and the UE may select a plurality of SNR threshold levels (i.e., first SNR threshold and second SNR threshold). In some examples, the SNR threshold levels may be predetermined or dynamically adjusted based on user preference or other protocol considerations driven by the user. For example, the SNR threshold levels may be selected based on the type and amount of data to be transmitted.

Upon selecting the default beam codebook and SNR threshold levels, the UE 115 and the base station 105 may enter UE discovery phase. At block 1515, the UE may receive directional primary synchronization signal (DPSS) waveform from the base station along a plurality of beamforming vectors from the default beam codebook. The UE may combine the received waveforms across a subarray of antennas at the UE from the UE selected default beam codebook. At block 1520, the UE may estimate the SNR of the received signal and determine whether the SNR of the received signal is above a first SNR threshold. If the UE determines that the SNR of the received signal is above the first SNR threshold, the UE, at block 1525 may transmit signal energy estimates, corresponding base station beamforming vector index and other relevant information for beamforming to the base station via RACH. Subsequently, at block 1530, the UE and the base station may enter post-RACH phase. At block 1535, the UE and the base station may refine the beam based on the received beam and SNR information. At block 1540, the UE and the base station may enter data phase and establish data communication with the selected beams.

Alternately, if the UE, at block 1520, determines that the SNR of the received signal is below the first threshold, the UE may further determine whether the received signal also falls below a second SNR threshold at block 1545. If the signal quality of the received signal falls below the second SNR threshold, the UE, at block 1550, may select a low-frequency back-up link option from the UE to base station (if available) or issue a distress signal. In some examples, the distress signal may request the base station to switch its beam codebook to a fine codebook. The UE may also switch its codebook to a fine codebook based on the issued distress signal. However, if the received signal is above a second SNR threshold, the UE, at block 1555, may issue signal to the base station requesting the base station switch its codebook to intermediate codebook, while maintaining coarse codebook for the UE. Upon selecting appropriate codebooks, the process flow 1500 may repeat at block 1505 utilizing the updated codebook selections (i.e., blocks 1550 and 1555). In some examples, the SNR threshold levels at block 1510 may also be adapted based on the codebook selections.

Figure 16:
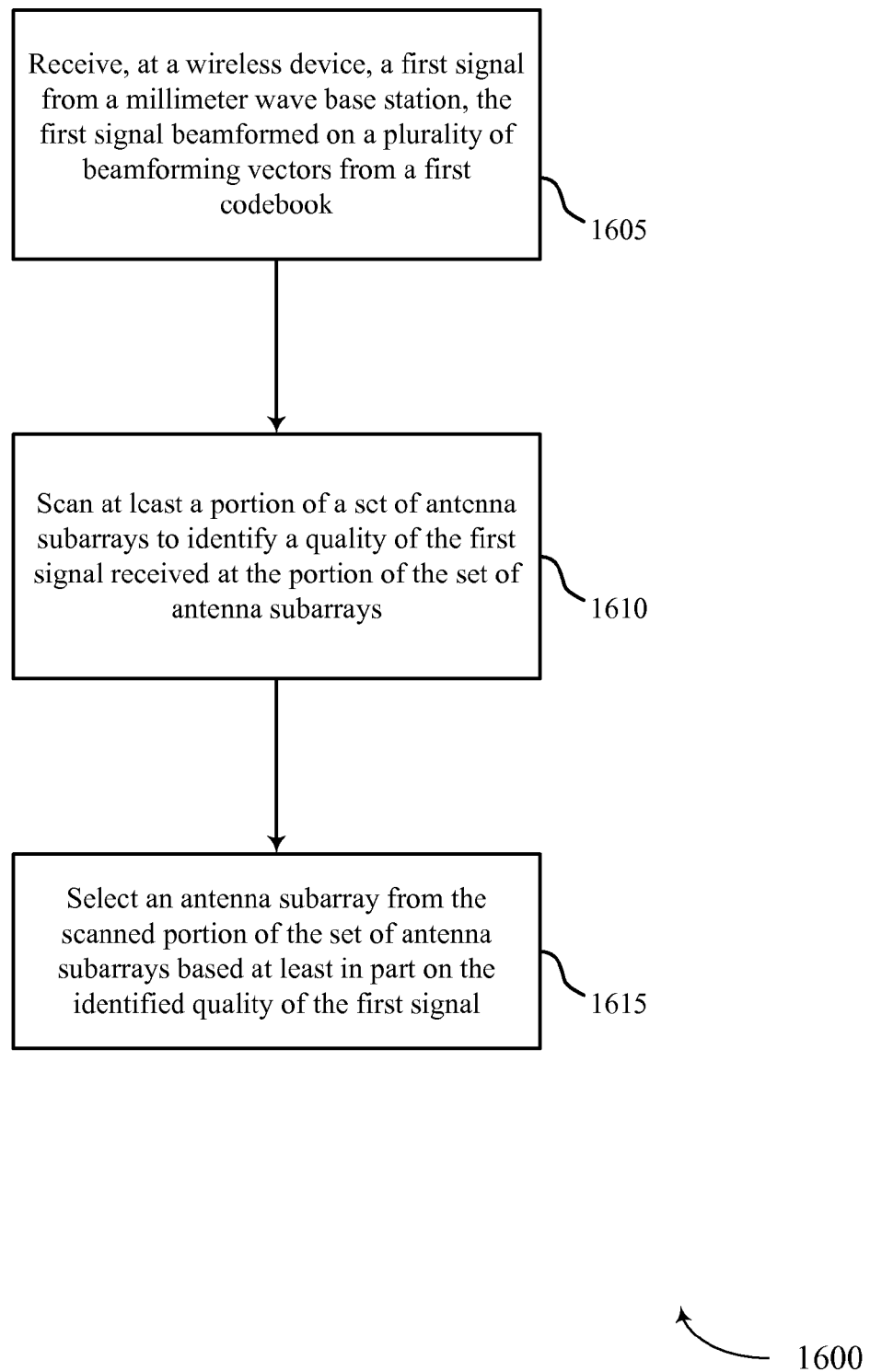
FIG. 16 shows a flowchart illustrating a method for fast selection of an antenna subarray and beamforming for millimeter wave wireless connections in accordance with various aspects of the present disclosure.

FIG. 16 shows a flowchart illustrating a method 1600 for fast selection of an antenna subarray and beamforming for millimeter wave wireless connections in accordance with various aspects of the present disclosure. The operations of method 1600 may be implemented by a UE 115 or its components as described with reference to FIGS. 1-4. For example, the operations of method 1600 may be performed by a communications management module 510 or 1010 as described with reference to FIGS. 5-10. In some examples, a UE 115 may execute a set of codes to control the functional elements of the UE 115 to perform the functions described below. Additionally or alternately, the UE 115 may perform aspects the functions described below using special-purpose hardware.

At block 1605, the UE 115 may receive, at a wireless device, a first signal from a millimeter wave base station, the first signal beamformed on a plurality of beamforming vectors from a first codebook, as described above with reference to FIGS. 2-4. In certain examples, the operations of block 1605 may be performed by the signal detection module 805 as described above with reference to FIGS. 8-9.

At block 1610, the UE 115 may scan at least a portion of a plurality of antenna subarrays to identify a quality of the first signal received at the portion of the plurality of antenna subarrays as described above with reference to FIGS. 2-4. In one embodiment, the portion of the plurality of antennas may be scanned with a plurality of beamforming vectors from a subarray selection codebook. In certain examples, the operations of block 1610 may be performed by the antenna scanning module 810 as described above with reference to FIGS. 8-9.

At block 1615, the UE 115 may select an antenna subarray from the scanned portion of the plurality of antenna subarrays based at least in part on the identified quality of the first signal as described above with reference to FIGS. 2-4. In certain examples, the operations of block 1615 may be performed by the antenna subarray selection module 815 as described above with reference to FIGS. 8-9.

Figure 17:
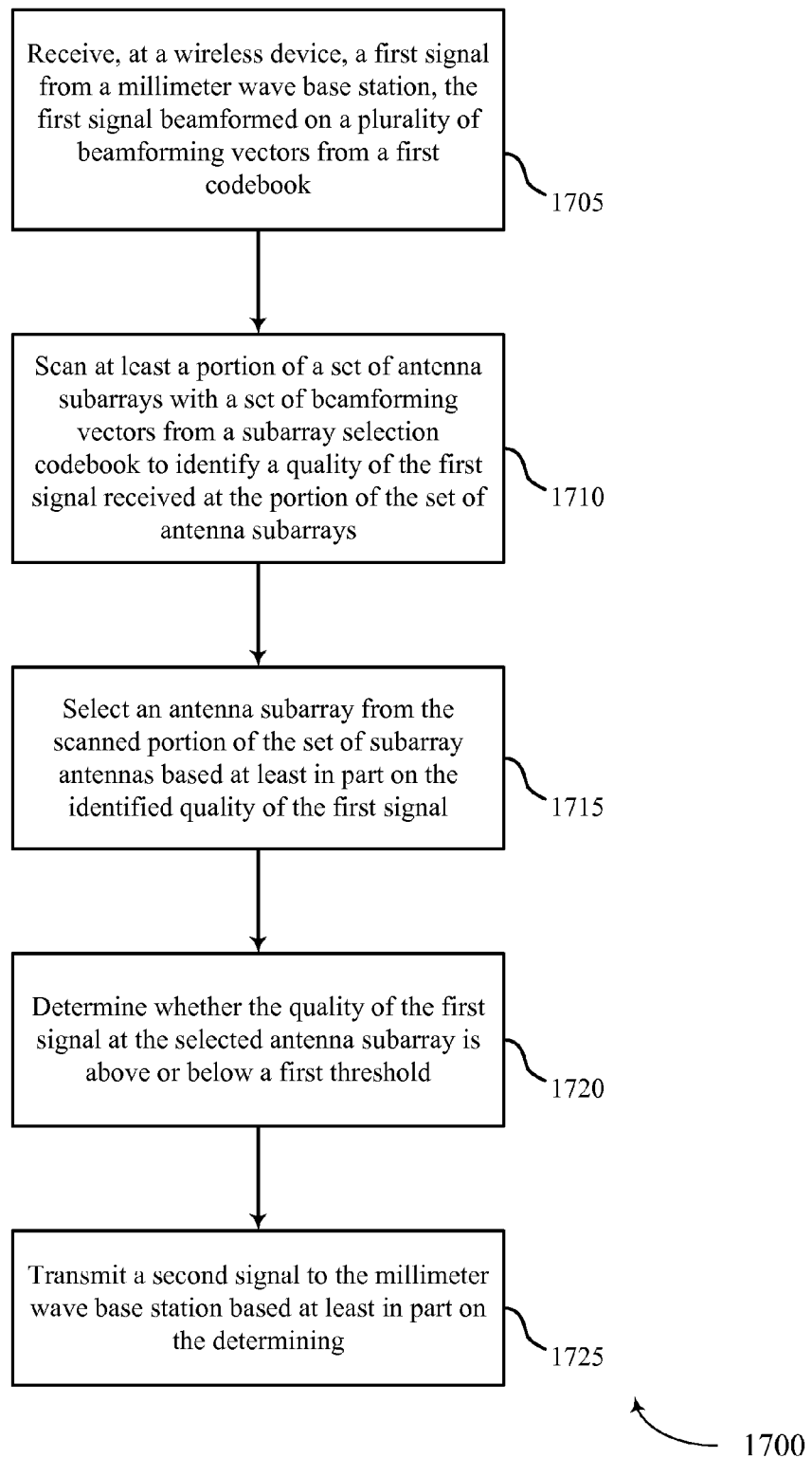
FIG. 17 shows a flowchart illustrating a method for fast selection of an antenna subarray and beamforming for millimeter wave wireless connections in accordance with various aspects of the present disclosure.

FIG. 17 shows a flowchart illustrating a method 1700 for fast selection of an antenna subarray and beamforming for millimeter wave wireless connections in accordance with various aspects of the present disclosure. The operations of method 1700 may be implemented by a UE 115 or its components as described with reference to FIGS. 1-4. For example, the operations of method 1700 may be performed by a communications management module 510 or 1010 as described with reference to FIGS. 5-10. In some examples, a UE 115 may execute a set of codes to control the functional elements of the UE 115 to perform the functions described below. Additionally or alternately, the UE 115 may perform aspects the functions described below using special-purpose hardware. The method 1700 may also incorporate aspects of method 1600 of FIG. 16.

At block 1705, the UE 115 may receive, at a wireless device, a first signal from a millimeter wave base station, the first signal beamformed on a plurality of beamforming vectors from a first codebook, as described above with reference to FIGS. 2-4. In certain examples, the operations of block 1705 may be performed by the signal detection module 805 as described above with reference to FIGS. 8 and 9.

At block 1710, the UE 115 may scan at least a portion of a plurality of antenna subarrays with a plurality of beamforming vectors from a subarray selection codebook to identify a quality of the first signal received at the portion of the plurality of antenna subarrays as described above with reference to FIGS. 2-4. In certain examples, the operations of block 1710 may be performed by the antenna scanning module 810 as described above with reference to FIGS. 8 and 9.

At block 1715, the UE 115 may select an antenna subarray from the scanned portion of the plurality of antenna subarrays based at least in part on the identified quality of the first signal as described above with reference to FIGS. 2-4. In certain examples, the operations of block 1715 may be performed by the antenna subarray selection module 815 as described above with reference to FIGS. 8 and 9.

At block 1720, the UE 115 may determine whether the quality of the first signal at the selected antenna subarray is above or below a first threshold as described above with reference to FIGS. 2-4. In certain examples, the operations of block 1720 may be performed by the SNR calculation module 905 as described above with reference to FIG. 9.

At block 1725, the UE 115 may transmit a second signal to the millimeter wave base station based at least in part on the determining as described above with reference to FIGS. 2-4. In certain examples, the operations of block 1725 may be performed by the signal transmission module 910 as described above with reference to FIG. 9.

Figure 18:
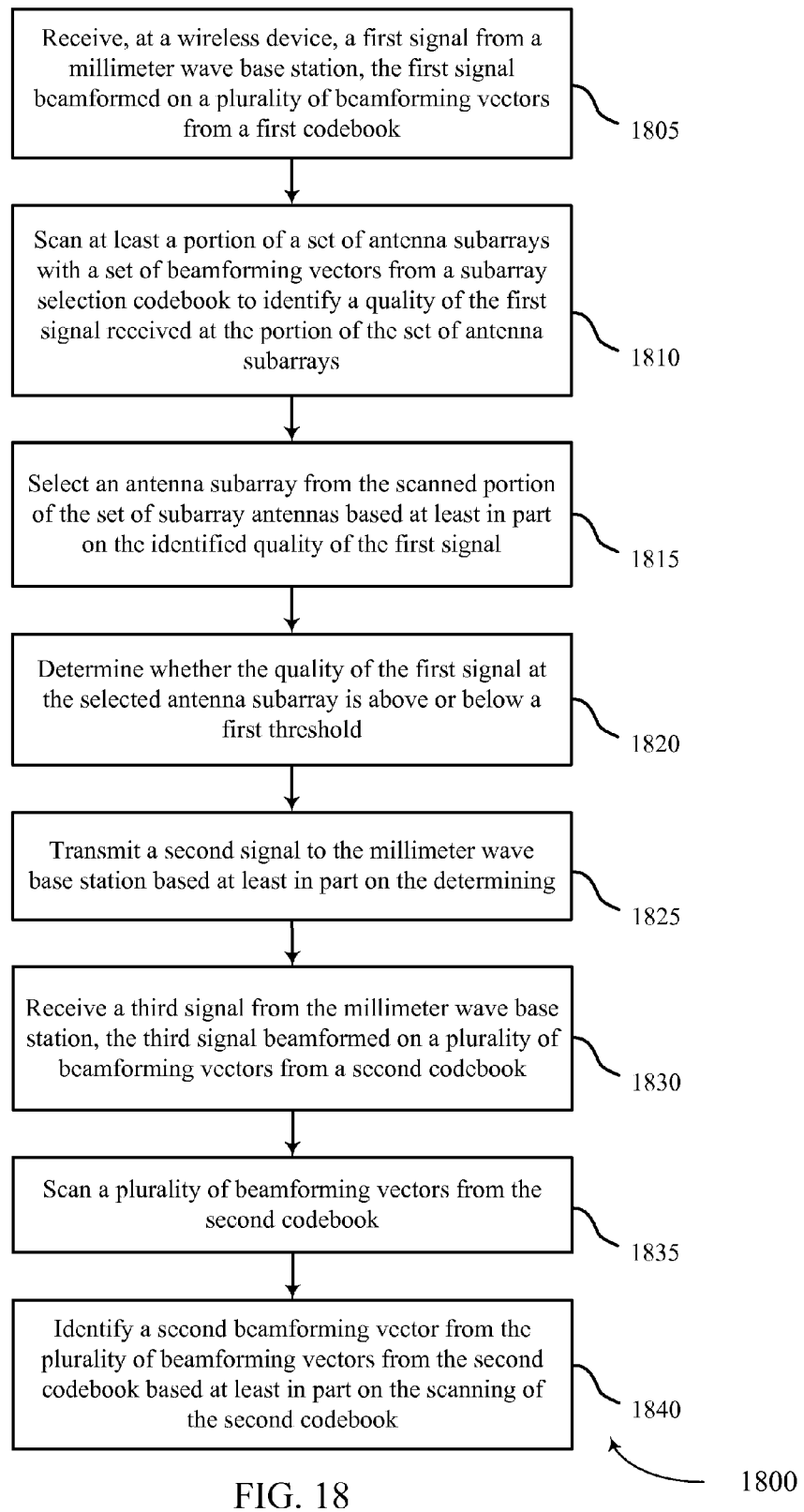
FIG. 18 shows a flowchart illustrating a method for fast selection of an antenna subarray and beamforming for millimeter wave wireless connections in accordance with various aspects of the present disclosure.

FIG. 18 shows a flowchart illustrating a method 1800 for fast selection of an antenna subarray and beamforming for millimeter wave wireless connections in accordance with various aspects of the present disclosure. The operations of method 1800 may be implemented by a UE 115 or its components as described with reference to FIGS. 1-4. For example, the operations of method 1800 may be performed by a communications management module 510 or 1010 as described with reference to FIGS. 5-10. In some examples, a UE 115 may execute a set of codes to control the functional elements of the UE 115 to perform the functions described below. Additionally or alternately, the UE 115 may perform aspects the functions described below using special-purpose hardware. The method 1800 may also incorporate aspects of methods 1600 or 1700 of FIGS. 16-17.

At block 1805, the UE 115 may receive, at a wireless device, a first signal from a millimeter wave base station, the first signal beamformed on a plurality of beamforming vectors from a first codebook, as described above with reference to FIGS. 2-4. In certain examples, the operations of block 1805 may be performed by the signal detection module 805 as described above with reference to FIGS. 8 and 9.

At block 1810, the UE 115 may scan at least a portion of a plurality of antenna subarrays with a plurality of beamforming vectors from a subarray selection codebook to identify a quality of the first signal received at the portion of the plurality of antenna subarrays as described above with reference to FIGS. 2-4. In certain examples, the operations of block 1710 may be performed by the antenna scanning module 810 as described above with reference to FIGS. 8 and 9.

At block 1815, the UE 115 may select an antenna subarray from the scanned portion of the plurality of antenna subarrays based at least in part on the identified quality of the first signal as described above with reference to FIGS. 2-4. In certain examples, the operations of block 1815 may be performed by the antenna subarray selection module 815 as described above with reference to FIGS. 8 and 9.

At block 1820, the UE 115 may determine whether the quality of the first signal at the selected antenna subarray is above or below a first threshold as described above with reference to FIGS. 2-4. In certain examples, the operations of block 1720 may be performed by the SNR calculation module 905 as described above with reference to FIG. 9.

At block 1825, the UE 115 may transmit a second signal to the millimeter wave base station based at least in part on the determining as described above with reference to FIGS.

2-4. In certain examples, the operations of block 1725 may be performed by the signal transmission module 910 as described above with reference to FIG. 9.

At block 1830, the UE 115 may receive a third signal from the millimeter wave base station, the third signal beamformed on a plurality of beamforming vectors from a second codebook as described above with reference to FIGS. 2-4. In certain examples, the operations of block 1815 may be performed by the signal detection module 805 as described above with reference to FIGS. 8 and 9.

At block 1835, the UE 115 may scan a plurality of beamforming vectors from the second codebook as described above with reference to FIGS. 2-4. In certain examples, the operations of block 1835 may be performed by the antenna scanning module 810 as described above with reference to FIGS. 8 and 9.

At block 1840, the UE 115 may identify a second beamforming vector from the plurality of beamforming vectors from the second codebook based on the scanning of the second codebook as described above with reference to FIGS. 2-4. In certain examples, the operations of block 1815 may be performed by the antenna subarray selection module 815 as described above with reference to FIGS. 8 and 9.

Figure 19:
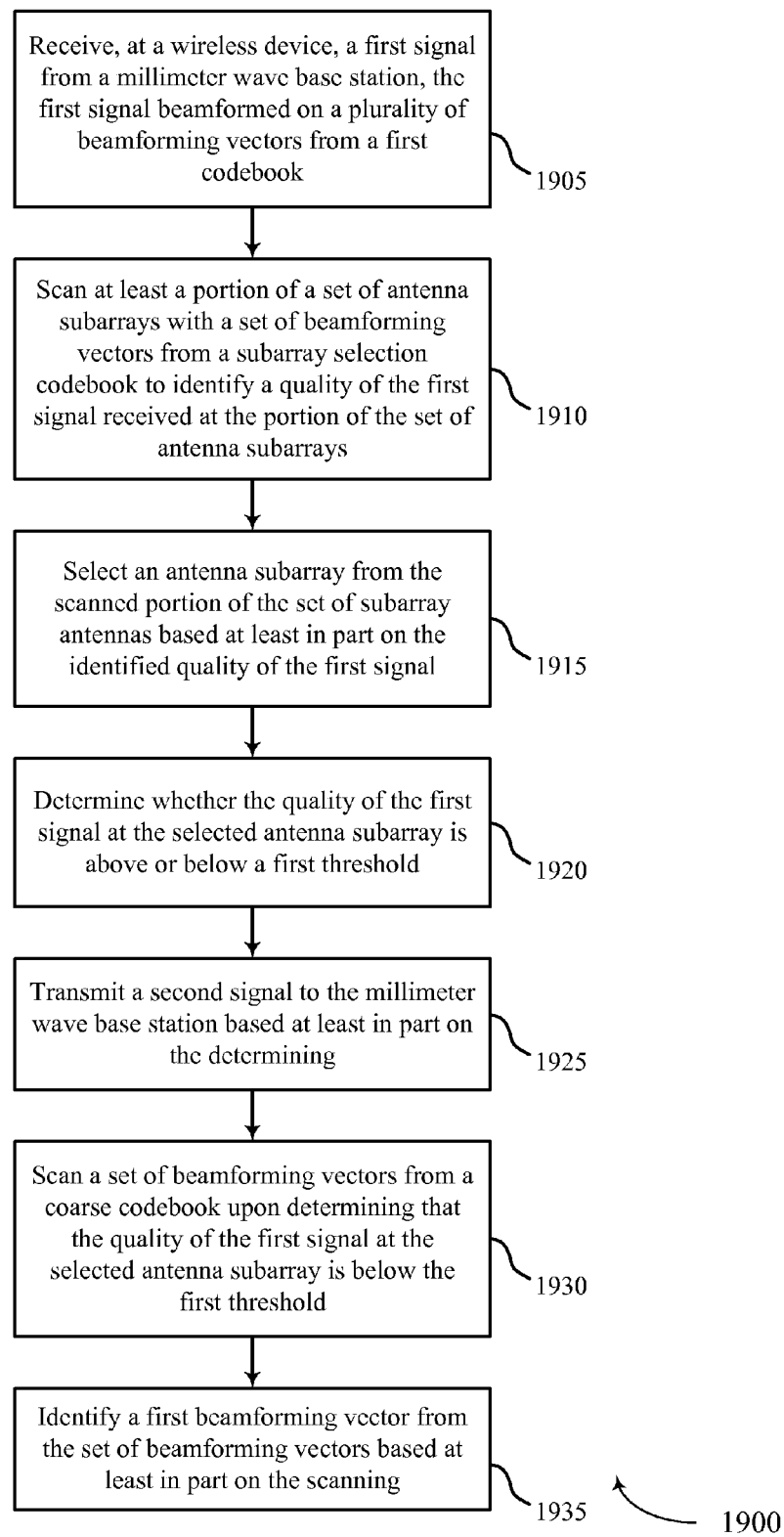
FIG. 19 shows a flowchart illustrating a method for fast selection of an antenna subarray and beamforming for millimeter wave wireless connections in accordance with various aspects of the present disclosure.

FIG. 19 shows a flowchart illustrating a method 1900 for fast selection of an antenna subarray and beamforming for millimeter wave wireless connections in accordance with various aspects of the present disclosure. The operations of method 1800 may be implemented by a UE 115 or its components as described with reference to FIGS. 1-4. For example, the operations of method 1900 may be performed by a communications management module 510 or 1010 as described with reference to FIGS. 5-10. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1600, 1700, and 1800 of FIGS. 16-18.

At block 1905, the UE 115 may receive, at a wireless device, a first signal from a millimeter wave base station, the first signal beamformed on a plurality of beamforming vectors from a first codebook, as described above with reference to FIGS. 2-4. In certain examples, the operations of block 1905 may be performed by the signal detection module 805 as described above with reference to FIGS. 8 and 9.

At block 1910, the UE 115 may scan at least a portion of a plurality of antenna subarrays with a plurality of beamforming vectors from a subarray selection codebook to identify the quality of the first signal received at the portion of the plurality of antenna subarrays as described above with reference to FIGS. 2-4. In certain examples, the operations of block 1910 may be performed by the antenna scanning module 810 as described above with reference to FIGS. 8 and 9.

At block 1915, the UE 115 may select an antenna subarray from the scanned portion of the plurality of antenna subarrays based at least in part on the identified quality of the first signal as described above with reference to FIGS. 2-4. In certain examples, the operations of block 1915 may be performed by the antenna subarray selection module 815 as described above with reference to FIGS. 8 and 9.

At block 1920, the UE 115 may determine whether the quality of the first signal at the selected antenna subarray is above or below a first threshold as described above with reference to FIGS. 2-4. In certain examples, the operations of block 1920 may be performed by the SNR calculation module 905 as described above with reference to FIG. 9.

At block 1925, the UE 115 may transmit a second signal to the millimeter wave base station based at least in part on the determining as described above with reference to FIGS. 2-4. In certain examples, the operations of block 1925 may be performed by the signal transmission module 910 as described above with reference to FIG. 9.

At block 1930, the UE 115 may scan a plurality of beamforming vectors from a coarse codebook upon determining that the quality of the first signal at the selected antenna subarray is below the first threshold as described above with reference to FIGS. 2-4. In certain examples, the operations of block 1930 may be performed by the beamforming vector scanning module 915 as described above with reference to FIG. 9.

At block 1935, the UE 115 may identify a first beamforming vector from the plurality of beamforming vectors based at least in part on the scanning as described above with reference to FIGS. 2-4. In certain examples, the operations of block 1935 may be performed by the beamforming identification module 920 as described above with reference to FIG. 9.

Figure 20:
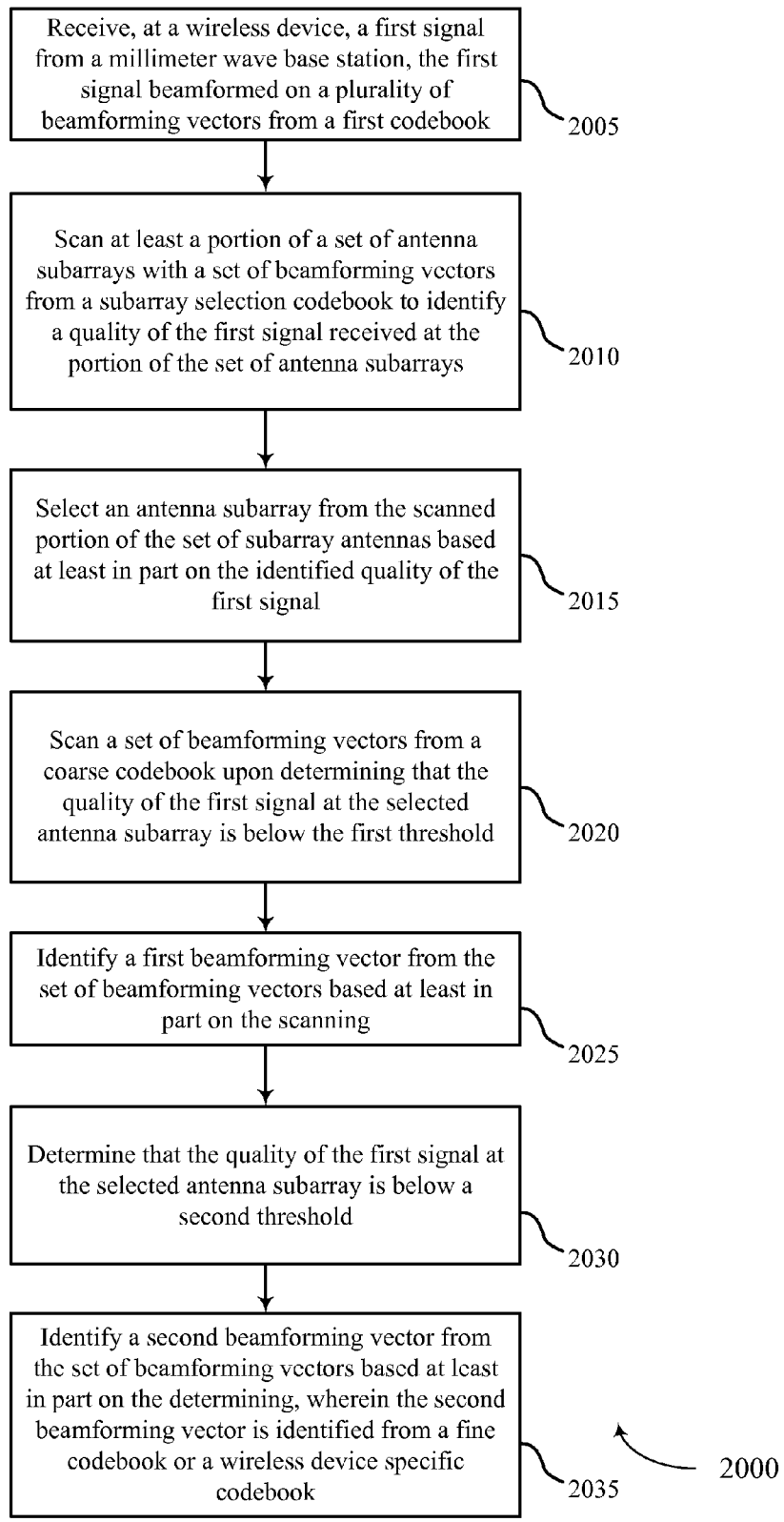
FIG. 20 shows a flowchart illustrating a method for fast selection of an antenna subarray and beamforming for millimeter wave wireless connections in accordance with various aspects of the present disclosure.

FIG. 20 shows a flowchart illustrating a method 1900 for fast selection of an antenna subarray and beamforming for millimeter wave wireless connections in accordance with various aspects of the present disclosure. The operations of method 2000 may be implemented by a UE 115 or its components as described with reference to FIGS. 1-4. For example, the operations of method 2000 may be performed by a communications management module 510 or 1010 as described with reference to FIGS. 5-10. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1600, 1700, 1800, and 1900 of FIGS. 16-19.

At block 2005, the UE 115 may receive, at a wireless device, a first signal from a millimeter wave base station, the first signal beamformed on a plurality of beamforming vectors from a first codebook, as described above with reference to FIGS. 2-4. In certain examples, the operations of block 2005 may be performed by the signal detection module 805 as described above with reference to FIGS. 8 and 9.

At block 2010, the UE 115 may scan at least a portion of a plurality of antenna subarrays with a plurality of beamforming vectors from a subarray selection codebook to identify a quality of the first signal received at the portion of the plurality of antenna subarrays as described above with reference to FIGS. 2-4. In certain examples, the operations of block 2010 may be performed by the antenna scanning module 810 as described above with reference to FIGS. 8 and 9.

At block 2015, the UE 115 may select an antenna subarray from the scanned portion of the plurality of antenna subarrays based at least in part on the identified quality of the first signal as described above with reference to FIGS. 2-4. In certain examples, the operations of block 2015 may be performed by the antenna subarray selection module 815 as described above with reference to FIGS. 8-9.

At block 2020, the UE 115 may scan a plurality of beamforming vectors from a coarse codebook upon determining that the quality of the first signal at the selected antenna subarray is below the first threshold as described above with reference to FIGS. 2-4. In certain examples, the operations of block 2020 may be performed by the beamforming vector scanning module 915 as described above with reference to FIG. 9.

At block 2025, the UE 115 may identify a first beamforming vector from the plurality of beamforming vectors based at least in part on the scanning as described above with reference to FIGS. 2-4. In certain examples, the operations of block 2025 may be performed by the beamforming identification module 920 as described above with reference to FIG. 9.

At block 2030, the UE 115 may determine that the quality of the first signal at the selected antenna subarray is below a second threshold as described above with reference to FIGS. 2-4. In certain examples, the operations of block 2030 may be performed by the SNR calculation module 905 as described above with reference to FIG. 9.

At block 2035, the UE 115 may identify a second beamforming vector from the plurality of beamforming vectors based at least in part on the determining, wherein the second beamforming vector is identified from a fine codebook or a wireless device specific codebook as described above with reference to FIGS. 2-4. In certain examples, the operations of block 2035 may be performed by the beamforming identification module 920 as described above with reference to FIG. 9.

Thus, methods 1600, 1700, 1800, 1900, and 2000 may provide for fast selection of an antenna subarray and beamforming for millimeter wave wireless connections. It should be noted that methods 1600, 1700, 1800, 1900, and 2000 describe possible implementation, and that the operations and the steps may be rearranged or otherwise modified such that other implementations are possible. In some examples, aspects from two or more of the methods 1600, 1700, 1800, 1900, and 2000 may be combined.

Figure 21:
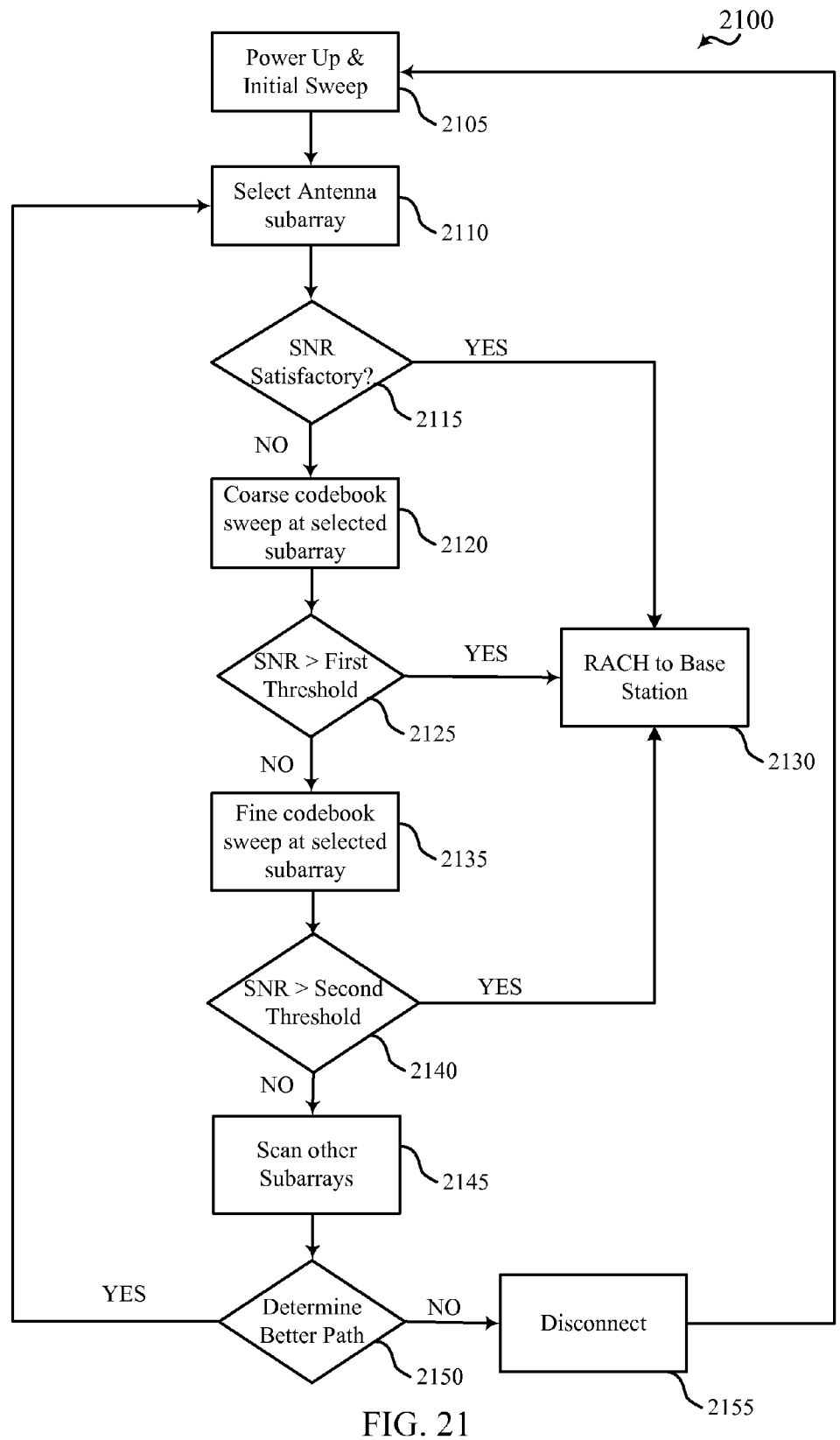
FIG. 21 illustrates an example of a process flow for fast selection of an antenna subarray and beamforming for millimeter wave wireless connections in accordance with various aspects of the present disclosure.

FIG. 21 illustrates an example of a process flow 2100 for fast selection of an antenna subarray and beamforming for millimeter wave wireless connections in accordance with various aspects of the present disclosure. Process flow 2100 may be executed by UE 115, which may be an example of a UE 115 described above with reference to FIGS. 2-4.

At block 2105, the UE 115 may receive a first signal from a millimeter wave base station during the UE discovery phase. In some examples, the UE may scan through a plurality of antenna subarrays one at a time with a single beamforming vector to estimate the received SNR at each subarray.

At block 2110, the UE 115 may select an antenna subarray from the scanned portion of the set of antenna subarrays based on the identified quality of the first signal. In some examples, the antenna subarray may be selected to maximize the UE's estimate of signal energy for subsequent UE signal processing.

At block 2115, the UE 115 may determine whether the quality of the first signal at the selected antenna subarray may be satisfactory for the data phase. In the event that the UE 115 determines that the UE's estimate of signal energy for best base station beamforming vector from the selected antenna subarray exceeds an appropriately chosen SNR threshold, the UE 115, at block 2120 may convey signal energy estimates, millimeter wave base station beamforming vector index and other relevant information for beamforming to the millimeter base station via the RACH. Subsequently the UE 115 and the base station may initiate data phase of communication.

However, if the UE 115, at block 2115 determines that the UE's estimate of signal energy for best base station beamforming vector from the selected antenna subarray falls below the chosen SNR threshold, the UE 115 may select a coarse codebook of beamforming vectors at both the base station end and the UE end at the selected antenna subarray. Additionally or alternately, the UE and the base station may adapt SNR thresholds based on the selected coarse codebook. After the selection of a coarse codebook sweep at the selected antenna subarray, the base station may transmit a directional primary synchronization signal (DPSS) waveform along each of the beamforming vectors from the selected codebook.

In response, at block 2125, the UE may determine whether the SNR for received signals utilizing the updated codebook is above another appropriately chosen threshold level. In the event that the received signals exceed the threshold level, the UE, at block 2130, may convey signal energy estimates, millimeter wave base station beamforming vector index and other relevant information for beamforming to the millimeter base station via the RACH. However, if the SNR for received signals falls below the threshold level, the UE 115, at block 2135 may select a finer codebook switch at the selected antenna subarray and at the base station. At block 2140, the UE may again determine whether the updated codebook selection improves the SNR for the received signals. If the received signal is above the second SNR threshold, the UE may enter the data phase at block 2130. However, if at block 2145, the UE 115 determines that the SNR is below the second threshold, the UE 115 may again scan a plurality of antenna subarrays for an improved link margin. Additionally or alternately, the UE 115 at block 2150 may also determine whether an alternate path exists between the base station and the UE 115 that may offer improved signal quality. In the event that a better path exists between the base station and the UE, the UE 115 may initiate the process flow 2100 again with a plurality of antenna subarrays for the alternate path. In contrast, if no alternate path exists, the UE 115, at block 2155 may disconnect process flow 2100 for a predetermined time period.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiplexing (FDM)A, orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communications at a wireless device, the method comprising:
    receiving, at the wireless device, a first signal from a millimeter wave base station, the first signal beamformed on a plurality of beamforming vectors from a first codebook;
    scanning a plurality of antenna subarrays, each of the plurality of antenna subarrays comprising a different subset of a plurality of antennas of the wireless device, to identify a quality of the first signal as received by each of the plurality of antenna subarrays; and
    selecting one of the plurality of antenna subarrays based at least in part on the identified quality of the first signal as received by at least one of the plurality of antenna subarrays.

2. The method of claim 1, wherein the scanning further comprises:
    scanning the plurality of antenna subarrays with a plurality of beamforming vectors from a subarray selection codebook to identify the quality of the first signal as received by each of the plurality of antenna subarrays.

3. The method of claim 2, further comprising:
    selecting a first beamforming vector from the plurality of beamforming vectors from the subarray selection codebook for a respective subarray from the plurality of antenna subarrays based at least on the identified quality of the first signal.

4. The method of claim 2, wherein the subarray selection codebook comprises at least one of:
   a pseudo-omni beam pattern codebook;
   an antenna selection codebook;
   a coarse codebook;
   an intermediate codebook;
   a fine codebook;
   a codebook designed to mitigate near-field impairments;
   a codebook designed to assist in channel estimation; or
   a codebook designed to assist in radio-frequency design, reduce system complexity, or reduce system cost; or
   a combination of beamforming vectors from different codebooks.

5. The method of claim 1, further comprising:
   initiating an on-demand search to identify a second beamforming vector from a plurality of beamforming vectors at the millimeter wave base station, wherein the second beamforming vector is identified from a group comprising at least one of a coarse codebook, an intermediate codebook, a fine codebook, a near-field impairment mitigation codebook, a channel estimation codebook, a complexity reduction codebook, or a wireless device specific codebook.

6. The method of claim 1, further comprising:
   determining whether the quality of the first signal at the selected antenna subarray is above or below a first threshold; and
   transmitting a second signal to the millimeter wave base station based at least in part on the determining.

7. The method of claim 6, further comprising:
   receiving, at the wireless device, a third signal from the millimeter wave base station, the third signal beamformed on a plurality of beamforming vectors from a second codebook;
   scanning a plurality of beamforming vectors from the second codebook; and
   identifying a second beamforming vector from a plurality of beamforming vectors from the second codebook based at least in part on the scanning a plurality of beamforming vectors from the second codebook.

8. The method of claim 6, further comprising:
   adapting the first threshold based at least in part on a selection of a beamforming vector by the wireless device.

9. The method of claim 6, further comprising:
   transmitting the second signal via a random access channel (RACH).

10. The method of claim 6, further comprising:
    determining that a signal quality of the first signal at the selected subarray is below the first threshold; and
    transmitting the second signal over a low-frequency carrier network coexisting with a millimeter wave carrier network based at least in part on determining that the signal quality of the first signal at the selected subarray is below the first threshold.

11. The method of claim 6, further comprising:
    transmitting the second signal via a highly-coded low-rate communication link already established with a unique identification.

12. The method of claim 6, wherein the second signal comprises a signal energy estimate, a beamforming vector index, information for beamforming, or a combination thereof.

13. The method of claim 6, further comprising:
    calculating a signal-to-noise ratio of the first signal to determine the quality of the first signal.

14. The method of claim 1, wherein the first signal is a directional primary synchronization signal.

15. An apparatus for wireless communications, comprising:
    a processor;
    memory in electronic communication with the processor; and
    instructions stored in the memory; wherein the instructions are executable by the processor to:
       receive, at a wireless device, a first signal from a millimeter wave base station, the first signal beamformed on a plurality of beamforming vectors from a first codebook;
       scan a plurality of antenna subarrays, each of the plurality of antenna subarrays comprising a different subset of a plurality of antennas of the wireless device, to identify a quality of the first signal as received by each of the plurality of antenna subarrays; and
       select one of the plurality of antenna subarrays based at least in part on the identified quality of the first signal as received by at least one of the plurality of antenna subarrays.

16. The apparatus of claim 15, wherein the instructions are executable by the processor to:
    scan the plurality of antenna subarrays with a plurality of beamforming vectors from a subarray selection codebook to identify the quality of the first signal as received by each of the plurality of antenna subarrays.

17. The apparatus of claim 16, wherein the instructions are executable by the processor to:
    select a first beamforming vector from the plurality of beamforming vectors from the subarray selection codebook for that subarray from the scanned portion of the plurality of antenna subarrays based at least on the identified quality of the first signal.

18. The apparatus of claim 16, wherein the subarray selection codebook comprises at least one of:
    a pseudo-omni beam pattern codebook;
    an antenna selection codebook;
    a coarse codebook;
    an intermediate codebook;
    a fine codebook;
    a codebook designed to mitigate near-field impairments;
    a codebook designed to assist in channel estimation;
    a codebook designed to assist in radio-frequency design, reduce system complexity, or reduce system cost;
    or a combination of beamforming vectors from different codebooks.

19. The apparatus of claim 15, wherein the instructions are executable by the processor to:
    initiate an on-demand search to identify a second beamforming vector from a plurality of beamforming vectors at the millimeter wave base station, wherein the second beamforming vector is identified from a group comprising at least one of a coarse codebook, an intermediate codebook, a fine codebook, a near-field impairment mitigation codebook, a channel estimation codebook, a complexity reduction codebook, or a wireless device specific codebook.

20. The apparatus of claim 15, wherein the instructions are executable by the processor to:
    determine whether the quality of the first signal at the selected antenna subarray is above or below a first threshold; and
    transmit a second signal to the millimeter wave base station based at least in part on the determining.

21. The apparatus of claim 20, wherein the instructions are executable by the processor to:
receive, at the wireless device, a third signal from the millimeter wave base station, the third signal beamformed on a plurality of beamforming vectors from a second codebook;
scan a plurality of beamforming vectors from the second codebook; and
identify a second beamforming vector from a plurality of beamforming vectors from the second codebook based at least in part on the scanning a plurality of beamforming vectors from the second codebook.

22. The apparatus of claim 20, wherein the instructions are executable by the processor to:
adapt the first threshold based at least in part on a selection of a beamforming vector by the wireless device.

23. The apparatus of claim 20, wherein the instructions are executable by the processor to:
transmit the second signal via a random access channel (RACH).

24. The apparatus of claim 20, wherein the instructions are executable by the processor to:
determine that a signal quality of the first signal at the selected subarray is below the first threshold; and
transmit the second signal over a low-frequency carrier network coexisting with a millimeter wave carrier network based at least in part on determining that the signal quality of the first signal at the selected subarray is below the first threshold.

25. The apparatus of claim 20, wherein the instructions are executable by the processor to:
transmit the second signal via a highly-coded low-rate communication link already established with a unique identification.

26. The apparatus of claim 20, wherein the second signal comprises a signal energy estimate, a beamforming vector index, information for beamforming, or a combination thereof.

27. The apparatus of claim 20, wherein the instructions are executable by the processor to:
calculate a signal-to-noise ratio of the first signal to determine the quality of the first signal.

28. The apparatus of claim 15, wherein the first signal is a directional primary synchronization signal.

29. An apparatus for wireless communications, comprising:
means for receiving, at a wireless device, a first signal from a millimeter wave base station, the first signal beamformed on a plurality of beamforming vectors from a first codebook;
means for scanning a plurality of antenna subarrays, each of the plurality of antenna subarrays comprising a different subset of a plurality of antennas of the wireless device, to identify a quality of the first signal as received by each of the plurality of antenna subarrays; and
means for selecting one of the plurality of antenna subarrays based at least in part on the identified quality of the first signal as received by at least one of the plurality of antenna subarrays.

30. The apparatus of claim 29, further comprising:
means for scanning the plurality of antenna subarrays with a plurality of beamforming vectors from a subarray selection codebook to identify the quality of the first signal as received by each of the plurality of antenna subarrays.

31. The apparatus of claim 30, further comprising:
means for selecting a first beamforming vector from the plurality of beamforming vectors from the subarray selection codebook for a respective subarray from the plurality of antenna subarrays based at least on the identified quality of the first signal.

32. The apparatus of claim 30, wherein the subarray selection codebook comprises at least one of:
a pseudo-omni beam pattern codebook;
an antenna selection codebook;
a coarse codebook;
an intermediate codebook;
a fine codebook;
a codebook designed to mitigate near-field impairments;
a codebook designed to assist in channel estimation;
a codebook designed to assist in radio-frequency design, reduce system complexity, or reduce system cost; or
or a combination of beamforming vectors from different codebooks.

33. The apparatus of claim 29, further comprising:
means for initiating an on-demand search to identify a second beamforming vector from a plurality of beamforming vectors at the millimeter wave base station, wherein the second beamforming vector is identified from a group comprising at least one of a coarse codebook, an intermediate codebook, a fine codebook, a near-field impairment mitigation codebook, a channel estimation codebook, a complexity reduction codebook, or a wireless device specific codebook.

34. The apparatus of claim 29, further comprising
means for determining whether the quality of the first signal at the selected antenna subarray is above or below a first threshold; and
means for transmitting a second signal to the millimeter wave base station based at least in part on the determining.

35. The apparatus of claim 18, further comprising:
means for adapting the first threshold based at least in part on a selection of a beamforming vector by the wireless device.

36. The apparatus of claim 18, further comprising:
means for transmitting the second signal via a random access channel (RACH).

37. The apparatus of claim 18, further comprising:
means for determining that a signal quality of the first signal at the selected subarray is below the first threshold; and
means for transmitting the second signal over a low-frequency carrier network coexisting with a millimeter wave carrier network based at least in part on determining that the signal quality of the first signal at the selected subarray is below the first threshold.

38. The apparatus of claim 18, further comprising:
means for transmitting the second signal via a highly-coded low-rate communication link already established with a unique identification.

39. The apparatus of claim 18, wherein the second signal comprises a signal energy estimate, a beamforming vector index, information for beamforming, or a combination thereof.

40. The apparatus of claim 34, further comprising:
means for calculating a signal-to-noise ratio of the first signal to determine the quality of the first signal.

41. The apparatus of claim 34, further comprising:
 means for receiving, at the wireless device, a third signal from the millimeter wave base station, the third signal beamformed on a plurality of beamforming vectors from a second codebook;
 means for scanning a plurality of beamforming vectors from the second codebook;
 means for identifying a second beamforming vector from a plurality of beamforming vectors from the second codebook based at least in part on the scanning a plurality of beamforming vectors from the second codebook.

42. The apparatus of claim 29, wherein the first signal is a directional primary synchronization signal.

43. A non-transitory computer-readable medium storing code for communication at a wireless device, the code comprising instructions executable to:
 receive, at the wireless device, a first signal from a millimeter wave base station, the first signal beamformed on a plurality of beamforming vectors from a first codebook;
 scan a plurality of antenna subarrays, each of the plurality of antenna subarrays comprising a different subset of a plurality of antennas of the wireless device, to identify a quality of the first signal as received by each of the plurality of antenna subarrays; and
 select one of the plurality of antenna subarrays based at least in part on the identified quality of the first signal as received by at least one of the plurality of antenna subarrays.

44. The non-transitory computer-readable medium of claim 43, wherein the scanning further comprises:
 scanning the plurality of antenna subarrays with a plurality of beamforming vectors from a subarray selection codebook to identify the quality of the first signal as received by each of the plurality of antenna subarrays.

45. The non-transitory computer-readable medium of claim 44, further comprising:
 selecting a first beamforming vector from the plurality of beamforming vectors from the subarray selection codebook for a respective subarray from the plurality of antenna subarrays based at least on the identified quality of the first signal.

46. The non-transitory computer-readable medium of claim 44, wherein the subarray selection codebook comprises at least one of:
 a pseudo-omni beam pattern codebook;
 an antenna selection codebook;
 a coarse codebook;
 an intermediate codebook;
 a fine codebook;
 a codebook designed to mitigate near-field impairments;
 a codebook designed to assist in channel estimation; or
 a codebook designed to assist in radio-frequency design, reduce system complexity, or reduce system cost; or
 a combination of beamforming vectors from different codebooks.

47. The non-transitory computer-readable medium of claim 43, further comprising:
 initiating an on-demand search to identify a second beamforming vector from a plurality of beamforming vectors at the millimeter wave base station, wherein the second beamforming vector is identified from a group comprising at least one of a coarse codebook, an intermediate codebook, a fine codebook, a near-field impairment mitigation codebook, a channel estimation codebook, a complexity reduction codebook, or a wireless device specific codebook.

48. The non-transitory computer-readable medium of claim 43, further comprising:
 determining whether the quality of the first signal at the selected antenna subarray is above or below a first threshold; and
 transmitting a second signal to the millimeter wave base station based at least in part on the determining.

49. The non-transitory computer-readable medium of claim 48, further comprising:
 receiving, at the wireless device, a third signal from the millimeter wave base station, the third signal beamformed on a plurality of beamforming vectors from a second codebook;
 scanning a plurality of beamforming vectors from the second codebook; and
 identifying a second beamforming vector from a plurality of beamforming vectors from the second codebook based at least in part on the scanning a plurality of beamforming vectors from the second codebook.

50. The non-transitory computer-readable medium of claim 48, further comprising:
 adapting the first threshold based at least in part on a selection of a beamforming vector by the wireless device.

51. The non-transitory computer-readable medium of claim 48, further comprising:
 transmitting the second signal via a random access channel (RACH).

52. The non-transitory computer-readable medium of claim 48, further comprising:
 determining that a signal quality of the first signal at the selected subarray is below the first threshold; and
 transmitting the second signal over a low-frequency carrier network coexisting with a millimeter wave carrier network based at least in part on determining that the signal quality of the first signal at the selected subarray is below the first threshold.

53. The non-transitory computer-readable medium of claim 48, further comprising:
 transmitting the second signal via a highly-coded low-rate communication link already established with a unique identification.

54. The non-transitory computer-readable medium of claim 48, wherein the second signal comprises a signal energy estimate, a beamforming vector index, information for beamforming, or a combination thereof.

55. The non-transitory computer-readable medium of claim 48, further comprising:
 calculating a signal-to-noise ratio of the first signal to determine the quality of the first signal.

56. The non-transitory computer-readable medium of claim 43, wherein the first signal is a directional primary synchronization signal.

* * * * *

UNITED STATES PATENT AND TRADEMARK OFFICE
CERTIFICATE OF CORRECTION

PATENT NO. : 9,872,296 B2
APPLICATION NO. : 14/822681
DATED : January 16, 2018
INVENTOR(S) : Raghavan et al.

It is certified that error appears in the above-identified patent and that said Letters Patent is hereby corrected as shown below:

In the Claims

Column 38, Claim 35, Line 39, should read as follows:
35. The apparatus of claim 34, further comprising:
    means for receiving, at the wireless device, a third signal from the millimeter wave base station, the third signal beamformed on a plurality of beamforming vectors from a second codebook;
    means for scanning a plurality of beamforming vectors from the second codebook;
    means for identifying a second beamforming vector from a plurality of beamforming vectors from the second codebook based at least in part on the scanning a plurality of beamforming vectors from the second codebook.

Column 38, Claim 36, Line 43, should read as follows:
36. The apparatus of claim 34, further comprising:
    means for adapting the first threshold based at least in part on a selection of a beamforming vector by the wireless device.

Column 38, Claim 37, Line 46, should read as follows:
37. The apparatus of claim 34, further comprising:
means for transmitting the second signal via a random access channel (RACH).

Column 38, Claim 38, Line 55, should read as follows:
38. The apparatus of claim 34, further comprising:
    means for determining that a signal quality of the first signal at the selected subarray is below the first threshold; and
    means for transmitting the second signal over a low-frequency carrier network coexisting with a millimeter wave carrier network based at least in part on determining that the signal quality of the first signal at the selected subarray is below the first threshold.

Signed and Sealed this
Thirty-first Day of July, 2018

Andrei Iancu
*Director of the United States Patent and Trademark Office*

Column 38, Claim 39, Line 59, should read as follows:

39. The apparatus of claim 34, further comprising:
    means for transmitting the second signal via a highly-coded low-rate communication link already established with a unique identification.